(12) United States Patent
Yiu

(10) Patent No.: US 11,031,982 B2
(45) Date of Patent: Jun. 8, 2021

(54) FILTER COEFFICIENT CONFIGURATION IN NEW RADIO SYSTEMS

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/816,807

(22) Filed: Mar. 12, 2020

(65) Prior Publication Data

US 2020/0220581 A1    Jul. 9, 2020

Related U.S. Application Data

(63) Continuation of application No. 16/407,126, filed on May 8, 2019, now Pat. No. 10,608,710, which is a
(Continued)

(51) Int. Cl.
| | |
|---|---|
| *H04W 24/10* | (2009.01) |
| *H04B 7/0426* | (2017.01) |
| *H04B 7/08* | (2006.01) |
| *H04B 17/336* | (2015.01) |
| *H04B 7/0408* | (2017.01) |
| *H04B 17/318* | (2015.01) |

(Continued)

(52) U.S. Cl.
CPC ........... *H04B 7/043* (2013.01); *H04B 7/0408* (2013.01); *H04B 7/0626* (2013.01); *H04B 7/0695* (2013.01); *H04B 7/088* (2013.01); *H04B 7/0857* (2013.01); *H04B 17/102* (2015.01); *H04B 17/318* (2015.01); *H04B 17/336* (2015.01); *H04W 24/10* (2013.01)

(58) Field of Classification Search
CPC ..................................................... H04W 24/10
See application file for complete search history.

(56) References Cited

U.S. PATENT DOCUMENTS

| | | | |
|---|---|---|---|
| 10,404,335 B2 | 9/2019 | Yiu | |
| 2012/0115463 A1* | 5/2012 | Weng | H04B 17/318 455/425 |

(Continued)

*Primary Examiner* — Kevin Kim
(74) *Attorney, Agent, or Firm* — Kowert Hood Munyon Rankin and Goetzel PC

(57) ABSTRACT

Aspects of filtering coefficient configuration operations are described. Some aspects include a user equipment (UE) decoding a measurement configuration information element (IE) including a measurement quantity parameter, a reference signal (RS)-type filter configuration and at least one filter coefficient. In some aspects, the UE filters at least one of a cell measurement result and a beam measurement result, according to the measurement configuration IE. If the measurement quantity parameter indicates the cell measurement quantity, the UE can filter the cell measurement result according to the RS type filter configuration and the filter coefficient to determine a measurement evaluation input for a measurement reporting operation. If the measurement quantity parameter indicates the beam measurement quantity, the UE can filter the beam measurement result according to the RS type filter configuration and the filter coefficient to determine a beam measurement selection input for a beam measurement selection operation.

20 Claims, 23 Drawing Sheets

Related U.S. Application Data continuation of application No. 16/162,541, filed on Oct. 17, 2018, now Pat. No. 10,404,335.

(60) Provisional application No. 62/575,281, filed on Oct. 20, 2017.

(51) Int. Cl.
*H04B 7/06* (2006.01)
*H04B 17/10* (2015.01)

(56) References Cited

U.S. PATENT DOCUMENTS

| | | | |
|---|---|---|---|
| 2017/0208494 A1* | 7/2017 | Moon | H04L 5/0048 |
| 2019/0058508 A1 | 2/2019 | Yiu | |
| 2020/0021336 A1* | 1/2020 | Da Silva | H04B 7/0626 |
| 2020/0022040 A1* | 1/2020 | Chen | H04W 56/001 |
| 2020/0068462 A1* | 2/2020 | Zetterberg | H04W 16/28 |
| 2020/0195326 A1* | 6/2020 | Da Silva | H04B 1/38 |

* cited by examiner

FIG. 7

FILTER COEFFICIENT CONFIGURATION IN NEW RADIO SYSTEMS

PRIORITY CLAIM

This application is a continuation of U.S. patent application Ser. No. 16/407,126, filed May 8, 2019, which is a continuation of U.S. patent application Ser. No. 16/162,541, filed Oct. 17, 2018, which claims priority to U.S. Provisional Patent Application Ser. No. 62/575,281 filed Oct. 20, 2017, each of which is incorporated herein by reference in its entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, wireless local area networks (WLANs), fifth-generation (5G) networks including 5G new radio (NR) networks, next-generation (NG) networks, 5G-LTE networks, and software-defined networks (SDNs).

BACKGROUND

In New Radio (NR) systems, signal measurement filtering can be used for radio resource management (RRM). One difference between NR and Long Term Evolution (LTE) systems is that NR includes beam level measurements and cell quality evaluation from beams. As a result, additional filters signal measurement filtering can be used for beam reporting purposes. Filtering coefficient configurations and signalling methods are needed for cell level measurements and beam level measurements.

BRIEF DESCRIPTION OF THE DRAWINGS

FIG. 7 is an illustration of an exemplary control plane protocol stack in accordance with some aspects;

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Radio resource management (RRM) configuration can include measurements that are performed by user equipment (UE). Such measurements can include intra-frequency NR measurements, inter-frequency NR measurements or inter-radio access technology (RAT) measurements for Evolved Universal Mobile Telecommunications System (UMTS) Terrestrial Radio Access (E-UTRA). Measurements can be beam level measurements or cell level measurements. In some aspects, a network entity can configure a measurement type to be performed, such as an access point (AP), radio access network (RAN) node or base station (BS) described in further detail with respect to FIGS. 2A and 2B. Configuring the measurement type can include encoding, and transmitting within signalling to a UE (e.g., UE 201 or 203 of FIG. 2A or 2B), a measurement configuration. In a non-limiting example, a measurement configuration can define a frequency of measurement, a signal type for measurement and a location within time-frequency resources that a UE is to measure.

A measurement configuration can define one or several reporting configurations, and a reporting configuration can define reporting criteria, for example, criteria by which a UE decides whether to generate a measurement report and criteria by which the network decides whether to handover the UE from one cell to another cell (e.g., reporting events). In some aspects, reporting criteria can include event triggered reporting, periodic reporting and event triggered periodic reporting. In some aspects, the measurement configuration can include filter coefficients and the UE may use the filter coefficients to filter measurements for evaluating reporting criteria and for determining measurements to report. Certain filtering coefficients are specific to the RRC protocol layer, and the UE can receive such filter coefficients within RRC signalling from a network entity (e.g., AP, BS, RAN node) and apply the coefficients in filtering operations on measurements. Aspects herein describe, in part, measurement configurations and specifically configurations of filter coefficients.

Figure 1:
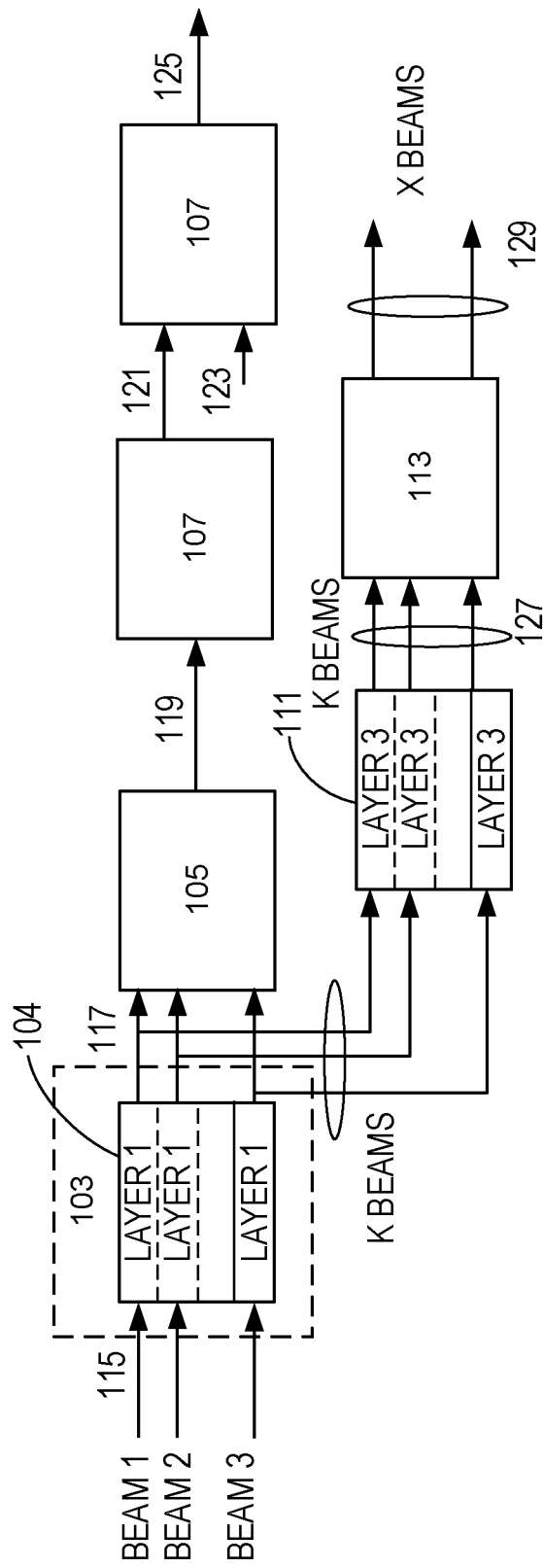
FIG. 1 illustrates a diagram of measurement and filtering system, in accordance with some aspects.

FIG. 1 illustrates a diagram of measurement and filtering system, in accordance with some aspects. Operations represented in the measurement and filtering system 100, or portions of the operations represented, may be performed by any one or more of the network entities or devices described herein. For example, the network entities or devices, including network function virtualization (NFV)-based or software-defined networking (SDN)-based network entities or devices of FIGS. 2A-2J.

In some aspects, the measurement and filtering system 100 can include filtering operations that can involve multiple protocol layers (e.g., layers of a protocol functions of the protocol layers) in a network system. Filtering operations, for example, can be performed in a layer 1 protocol layer (e.g., physical layer) or in a layer 3 protocol layer (e.g., radio resource control (RRC) layer), or both layer 1 and layer 3 of the network system. Details of such protocol layers are further described with respect to FIGS. 4, 7 and 8. The measurement and filtering system 100 can include operations such as beam measurement 115, physical layer filtering 104 (e.g., layer 1 filtering), beam consolidation and/or selection 105, RRC layer filtering for cell quality 107, evaluation of reporting criteria 109, RRC layer filtering of beam measurements 111 and beam selection for measurement reporting 113.

A device (e.g., UE 201 or 203) can measure one or multiple received beams, such as beams transmitted from an AP (e.g., RAN node 213, 215, 243) in the network (e.g., system 200A, 200B), for example, processing circuitry within an apparatus of the UE can configure transceiver circuitry to receive such beams. According to the UE implementation 103 can filter the beam measurements. In certain aspects, a filter (e.g., layer 1 filter or layer 3 filter) can be configured to perform filtering of beam measurements and/ or cell measurements. The filter can be included, for example, within an apparatus and/or circuitry of the UE, and in some instances can be a virtualized or software defined filter function.

In some aspects, the device can filter the beam measurements according to a UE-specific implementation in layer 1 (e.g., physical layer). As a result of filtering the beam measurements, the UE can generate beam specific measurements 117 that can be reported by the physical layer to the RRC layer after the physical layer filtering. Using the beam specific measurements 117 as inputs, the UE can consolidate beam specific measurements 105 to derive a cell quality value 119. In some aspects, beam consolidation and/or beam selection can be configured and controlled by the AP through RRC signalling transmitted from the AP to the UE.

In some aspects, the RRC signalling can also include a configuration of RRC layer (e.g., layer 3) filtering parameters and/or filtering coefficients. The UE can use the filtering parameters and coefficients to filter the measurements, for example, using RRC layer filtering. In some aspects, using the cell quality value 119 as an input, the UE can use RRC layer filtering for cell quality 107. As a result of filtering for cell quality 107, the UE can generate input values 121 for evaluation of reporting criteria. In certain aspects, one or more additional inputs 123 may be used for the evaluation of reporting criteria.

The evaluation of reporting criteria 109 can include evaluating whether measurement reporting is to be used to report measurements to a network entity (e.g., AP, RAN node). A reporting event can be an event where a signal strength of a neighbor cell becomes an offset better than a signal strength of a primary cell (PCell) (e.g., A3 event) or where the signal strength of the neighbor cell becomes an offset better than the signal strength of a secondary cell (SCell) (e.g., A6 event). In some aspects, reported measurements can include information to be used for RRM, reference signal received power (RSRP), reference signal received quality (RSRQ), and/or signal-to-interference-plus-noise ratio (SINR). The evaluation can be based on more than one flow of measurements or inputs 121, for example, for the purpose of comparing between different measurements (e.g., 121 and 123). In some aspects, the UE can evaluate the reporting criteria every time a new measurement result is reported at inputs 121 and 123. Reporting criteria can be configured through RRC signalling (e.g., transmitted by an AP, BS or RAN node to a UE).

In some aspects, the UE or a filter within the UE can perform RRC layer (e.g., layer 3) beam filtering 111 on measurements, such as the beam-specific measurements 117. Beam filtering can be configured by RRC signalling that can include filtering parameters and/or filtering coefficients, of which the UE can use for filtering beam-specific measurements 117. As a result of the beam filtering 111, the UE can generate a filtered beam-specific measurement 127 that can be used as an input for selecting a number of measurements 113 to be evaluated and potentially reported in a measurement report. In certain aspects, the beam-specific measurements 117 and the filtered beam-specific measurement 127 can be a number of beams (e.g., K beams) that can correspond to measurements in certain time-frequency resources. For example, time-frequency resources, such as synchronization signal blocks (SSB) (e.g., NR-SS block) or channel state information-reference signals (CSI-RS). Such resources can be configured by a network entity (e.g., BS, RAN node) through the RRC layer and detected by the UE through the physical layer.

The UE can perform beam selection for beam reporting, in some aspects, and the UE can select a number of measurements from the filtered beam-specific measurements 127. The selected filtered beam-specific measurements 127 can be used for measurement reporting 129 (e.g., X beams) and the selecting can be configured through RRC signalling. A measurement report, including cell measurement quantities and beam measurement quantities that are filtered according to filter coefficients, can be encoded by processing circuitry of the UE and transmitted by transceiver circuitry to the AP, BS or RAN node. In some aspects, the measurement configuration in RRC signalling can include one or more parameters, information elements (IE) and/or coefficients, such as a measurement object, a reporting configuration, a measurement identity, and a quantity configuration.

The measurement object parameter can include information such as a list of objects on which the UE shall perform measurements. For example, a measurement object can include a list of measurement objects to add, remove and/or to modify. In certain aspects, the UE can store in memory the list of measurement objects and add, remove or modify the list according to the measurement object parameters or coefficients in the RRC signalling. In some aspects, the RRC signalling can include different parameters or coefficients to indicate different measurement objects (e.g., two measurement objects are indicated by separate coefficients), and in other aspects, the same coefficient can indicate more than one measurement object.

In some aspects, the reporting configuration parameter can include a list of reporting configurations and a single measurement object can correspond to one or multiple reporting configurations. A reporting configuration can consist of a reporting criterion that triggers the UE to send a measurement report that can be a periodical or a single event description. The reporting configuration can also include a reference signal (RS) type indication that the UE can use for beam and cell measurement results (e.g., SSB or CSI-RS measurement results). The reporting configuration can also include a reporting format including the quantities per cell and per beam, and other associated information such as the maximum number of cells and the maximum number beams per cell, that the UE can include in a measurement report.

In some aspects, a measurement identity parameter can include a list of measurement identities where a measurement identity can link one measurement object with one reporting configuration. By configuring multiple measurement identities, more than one measurement object can be linked to the same reporting configuration, and more than one reporting configuration can be linked to the same measurement object. In certain aspects, the measurement identity is also included in the measurement report that triggers the reporting, serving as a reference to the network. In some aspects, a quantity configuration parameter can define a measurement filtering configuration that can be used for all event evaluation and related reporting, and for periodical reporting of the measurement. In some aspects, the quantity configuration parameter (e.g., IE) can specify measurement quantities and RRC layer (e.g., layer 3) filtering coefficients, for example, for NR measurements and E-UTRA measurements.

The quantity configuration IE, for example, can include one or more parameters and/or coefficients (e.g., layer 3 filtering coefficients) for the UE to use in filtering cell and beam measurements. Such parameters (e.g., coefficients) can include, for example, separate coefficients for cell quantity and beam quantity, separate coefficients for reference signal types such as a synchronization signal block (SSB)-based coefficient or a channel state information-reference signal (CSI-RS)-based coefficient, and separate filter coefficients (e.g., layer 3 filtering coefficients) such as a reference signal received power (RSRP) filter coefficient, a reference signal received quality (RSRQ) filter coefficient and a reference signal-signal to interference plus noise ratio (RS-SINR) filter coefficient. In some aspects, the UE can use the measurement configuration (e.g., received in RRC signalling), and any of the parameters or coefficients included therein, to perform beam and cell measurements and measurement reporting, as described further below with respect to FIG. 11.

Figure 2A:
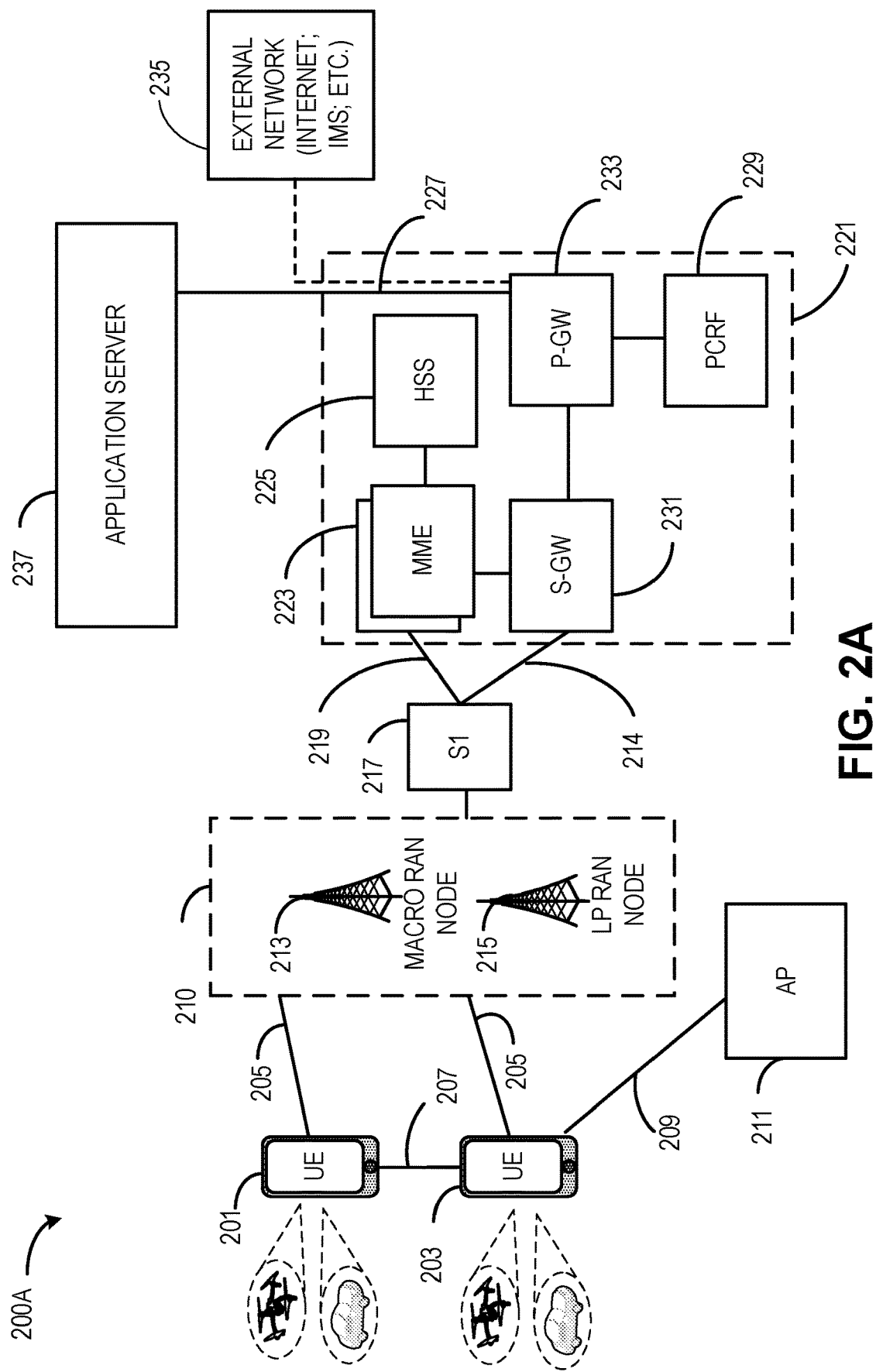
FIG. 2A illustrates an exemplary architecture of a network in accordance with some aspects.

FIG. 2A illustrates an architecture of a system 200A of a network in accordance with some aspects. In some aspects, the system 200A may be configured for the measurement and filtering operations and/or filtering coefficient signalling methods described herein. The system 200A is shown to include a user equipment (UE) 201 and a UE 201/203. The UEs 201/203 may be smartphones (e.g., handheld touch-screen mobile computing devices connectable to one or more cellular networks) or any mobile or non-mobile computing device, such as Personal Data Assistants (PDAs), pagers, laptop computers, desktop computers, wireless handsets, or any computing device including a wireless communications interface. In some aspects, the UE 201/203 may be Internet-of-Things (IoT)-enabled devices, configured to communicate with a RAN 210 or a core network (CN) 221, including but not limited to vehicles or drones.

In some aspects, any of the UEs 201/203 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201/203 may be configured to connect, in a wired or wireless configuration, e.g., communicatively couple, with a radio access network (RAN) 210. The RAN 210 may be, for example, an Evolved Universal Mobile Telecommunications System (UMTS) Terrestrial Radio Access Network (E-UTRAN), a NextGen RAN (NG-RAN), 5G RAN, or some other type of RAN. The UEs 201/203 utilize connections 205, each of which comprises a physical communications interface or layer (discussed in further detail below); in this example, the connections 205 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this aspect, the UEs 201/203 may further directly exchange communication data via a ProSe interface 207. The ProSe interface 207 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). The UE 201/203 is shown to be configured to access an access point (AP) 211 via connection 209. The connection 209 can comprise a local wireless connection, such as a connection consistent with any IEEE 802.11 protocol, where the AP 211 would comprise a wireless fidelity (WiFi®) router. In this example, the AP 211 is shown to be connected to the Internet without connecting to the core network of the wireless system (described in further detail below).

The RAN 210 can include one or more access nodes (ANs) or access points (APs) that enable the connections 205, for example, for filter coefficient configuration and measurement operations. These ANs can be referred to as base stations (BSs), NodeBs, evolved NodeBs (eNBs), next Generation NodeBs (e.g., gNB, ng-eNB), RAN nodes, and so forth, and can comprise ground stations (e.g., terrestrial access points) or satellite stations providing coverage within a geographic area (e.g., a cell). In some aspects, the communication nodes 213 and 215 can be transmission/reception points (TRPs). In instances when the communication nodes 213 and 215 are NodeBs (e.g., eNBs or gNBs), one or more TRPs can function within the communication cell of the NodeBs. In some aspects, a NodeB can be a E-UTRA-NR (EN)-gNB (en-gNB) configured to support E-UTRA-NR Dual Connectivity (EN-DC) (e.g., multi-RAT Dual Connectivity (MR-DC)), in which a UE may be connected to one eNB that acts as a master node (MN) and one en-gNB that acts as a secondary node (SN).

The RAN 210 may include one or more RAN nodes for providing macrocells, e.g., macro RAN node 213, and one or more RAN nodes for providing femtocells or picocells (e.g., cells having smaller coverage areas, smaller user capacity, or higher bandwidth compared to macrocells), e.g., low power (LP) RAN node 215. Any of the RAN nodes 213 and 215 can terminate the air interface protocol and can be the first point of contact for the UEs 201/203. In some aspects, any of the RAN nodes 213 and 215 can fulfill various logical functions for the RAN 210 including, but not limited to, radio network controller (RNC) functions such as radio bearer management, uplink and downlink dynamic radio resource management and data packet scheduling, and mobility management. In an example, any of the nodes 213 or 215 can be a new generation node-B (gNB), an evolved node-B (eNB), or another type of RAN node.

In accordance with some aspects, the UEs 201/203 can be configured to communicate using Orthogonal Frequency-Division Multiplexing (OFDM) communication signals with each other or with any of the RAN nodes 213 and 215 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 213 and 215 to the UEs 201/203, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signalling to the UEs 201/203. The physical downlink control channel (PDCCH) may carry information about the transport format and resource allocations related to the PDSCH channel, among other things. It may also inform the UEs 201/203 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 213 and 215 based on channel quality information fed back from any of the UEs 201/203. The downlink resource assignment information may be sent on the PDCCH used for (e.g., assigned to) each of the UEs 201/203.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

Entities within a RAN (e.g., RAN 210), such as RAN Nodes (e.g., 213, 215), can be connected (e.g., communicatively coupled), in a wired or wireless configuration, to one or more network entities, including to one another. For example, a connection can include a backhaul connection. Wired connections can include ethernet, coaxial cable, fiber optic cable, although aspects are not so limited. The RAN 210 is shown to be communicatively coupled to a core network (CN) 221 via an S1 interface 217. In aspects, the CN 221 may be an evolved packet core (EPC) network, a NextGen Packet Core (NPC) network, or some other type of CN (e.g., as illustrated in reference to FIGS. 2B-2I). In this aspect the S1 interface 217 is split into two parts: the S1-U interface 214, which carries traffic data between the RAN nodes 213 and 215 and the serving gateway (S-GW) 231, and the S1-mobility management entity (MME) interface 219, which is a signalling interface between the RAN nodes 213 and 215 and MMEs 223.

In this aspect, the CN 221 comprises the MMEs 223, the S-GW 231, the Packet Data Network (PDN) Gateway (P-GW) 223, and a home subscriber server (HSS) 225. The MMEs 223 may be similar in function to the control plane of legacy Serving General Packet Radio Service (GPRS) Support Nodes (SGSN). The MMEs 223 may manage mobility aspects in access such as gateway selection and tracking area list management. The HSS 225 may comprise a database for network users, including subscription-related information to support the network entities' handling of communication sessions. The CN 221 may comprise one or several HSSs 225, depending on the number of mobile subscribers, on the capacity of the equipment, on the organization of the network, etc. For example, the HSS 225 can provide support for routing/roaming, authentication, authorization, naming/addressing resolution, location dependencies, etc.

The S-GW 231 may terminate the S1 interface 219 towards the RAN 210, and route data packets between the RAN 210 and the CN 221. In addition, the S-GW 231 may be a local mobility anchor point for inter-RAN node handovers and also may provide an anchor for inter-3GPP mobility. Other responsibilities may include lawful intercept, charging, and some policy enforcement. The P-GW 233 may terminate an SGi interface toward a PDN. The P-GW 233 may route data packets between the CN 221 and external networks such as a network including the application server 237 (alternatively referred to as application function (AF)) via an Internet Protocol (IP) interface 227. The P-GW 233 can also communicate data to other external networks 235, which can include the Internet, IP multimedia subsystem (IPS) network, and other networks. Generally, the application server 237 may be an element offering applications that use IP bearer resources with the core network (e.g., UMTS Packet Services (PS) domain, LTE PS data services, etc.). In this aspect, the P-GW 233 is shown to be communicatively coupled to an application server 237 via an IP communications interface 227. The application server 237 can also be configured to support one or more communication services (e.g., Voice-over-Internet Protocol (VoIP) sessions, PTT sessions, group communication sessions, social networking services, etc.) for the UEs 201/203 via the CN 221.

The P-GW 233 may further be a node for policy enforcement and charging data collection. Policy and Charging Enforcement Function (PCRF) 229 is the policy and charging control element of the CN 221. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 229 may be communicatively coupled to the application server 237 via the P-GW 233. The application server 237 may signal the PCRF 229 to indicate a new service flow and select the appropriate Quality of Service (QoS) and charging parameters. The PCRF 229 may provision this rule into a Policy and Charging Enforcement Function (PCEF) (not shown) with the appropriate traffic flow template (TFT) and QoS class of identifier (QCI), which commences the QoS and charging as specified by the application server 237.

In an example, any of the nodes 213 or 215 can be configured to communicate to the UEs 201/203 (e.g., dynamically) by an antenna panel selection and a receive (Rx) beam selection that can be used by the UE for data reception on a physical downlink shared channel (PDSCH) as well as for channel state information reference signal (CSI-RS) measurements and channel state information (CSI) calculation. In an example, any of the nodes 213 or 215 can be configured to communicate to the UEs 201/203 (e.g., dynamically) by an antenna panel selection and a transmit (Tx) beam selection that can be used by the UE for data transmission on a physical uplink shared channel (PUSCH) as well as for sounding reference signal (SRS) transmission.

In some aspects, the communication network 240A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected or reduced. In addition, some NB-IoT UEs can be configured to transmit at maximum power if repetitions are used for UL transmission. This may result in large inter-cell interference in dense small cell deployments.

Figure 2B:
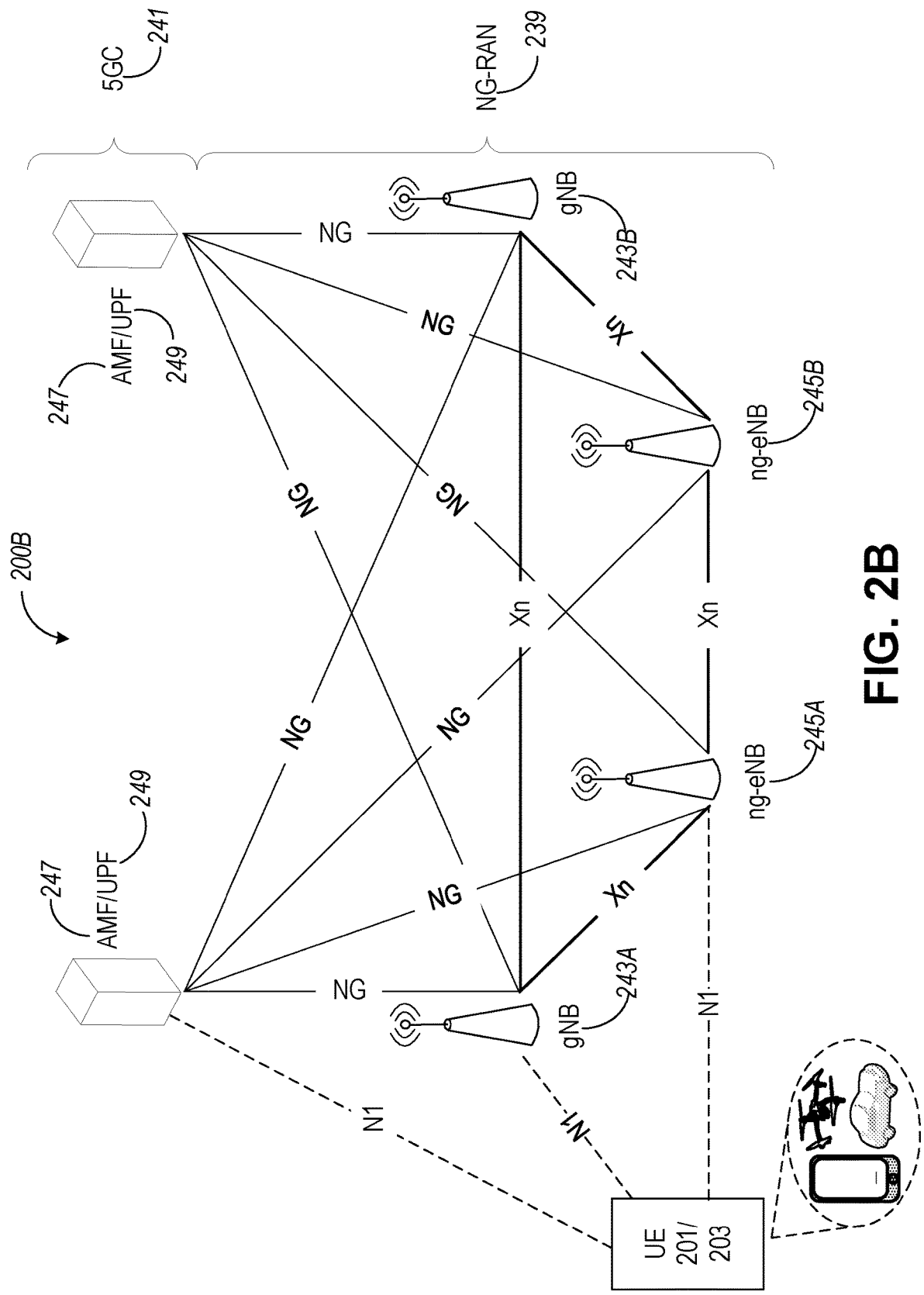
FIG. 2B is a simplified diagram of an exemplary Next-Generation (NG) system architecture in accordance with some aspects.

FIG. 2B illustrates an exemplary Next Generation (NG) system architecture 200B in accordance with some aspects. Referring to FIG. 2B, the NG system architecture 200B includes NG-RAN 239 and a 5G network core (5GC) 241. The NG-RAN 239 can include a plurality of nodes, for example, gNBs 243A and 243B, and NG-eNBs 245A and 245B. System 200B can include wired or wireless connections (e.g., communicative coupling) to wired or wireless communication devices, such as client devices. The gNBs 243A/243B and the NG-eNBs 245A/245B can be communicatively coupled to the UE 201/203 via, for example, an N1 interface. The core network 241 (e.g., a 5G core network or 5GC) can include an access and mobility management function (AMF) 247 or a user plane function (UPF) 249. The AMF 247 and the UPF 249 can be communicatively coupled to the gNBs 243A/243B and the NG-eNBs 245A/245B via NG interfaces. More specifically, in some aspects, the gNBs 243A/243B and the NG-eNBs 245A/245B can be connected to the AMF 247 by NG-C interfaces, and to the UPF 249 by NG-U interfaces. The gNBs 243A/243B and the NG-eNBs 245A/245B can be coupled to each other via Xn interfaces.

In some aspects, a gNB 243 can include a node providing New Radio (NR) user plane and control plane protocol termination towards the UE, and can be connected via the NG interface to the 5GC 241. In some aspects, an NG-eNB 245A/245B can include a node providing evolved universal terrestrial radio access (E-UTRA) user plane and control plane protocol terminations towards the UE, and is connected via the NG interface to the 5GC 241. In some aspects, any of the gNBs 243A/243B and the NG-eNBs 245A/245B can be implemented as a base station (BS), a mobile edge server, a small cell, a home eNB, although aspects are not so limited.

Figure 2C:
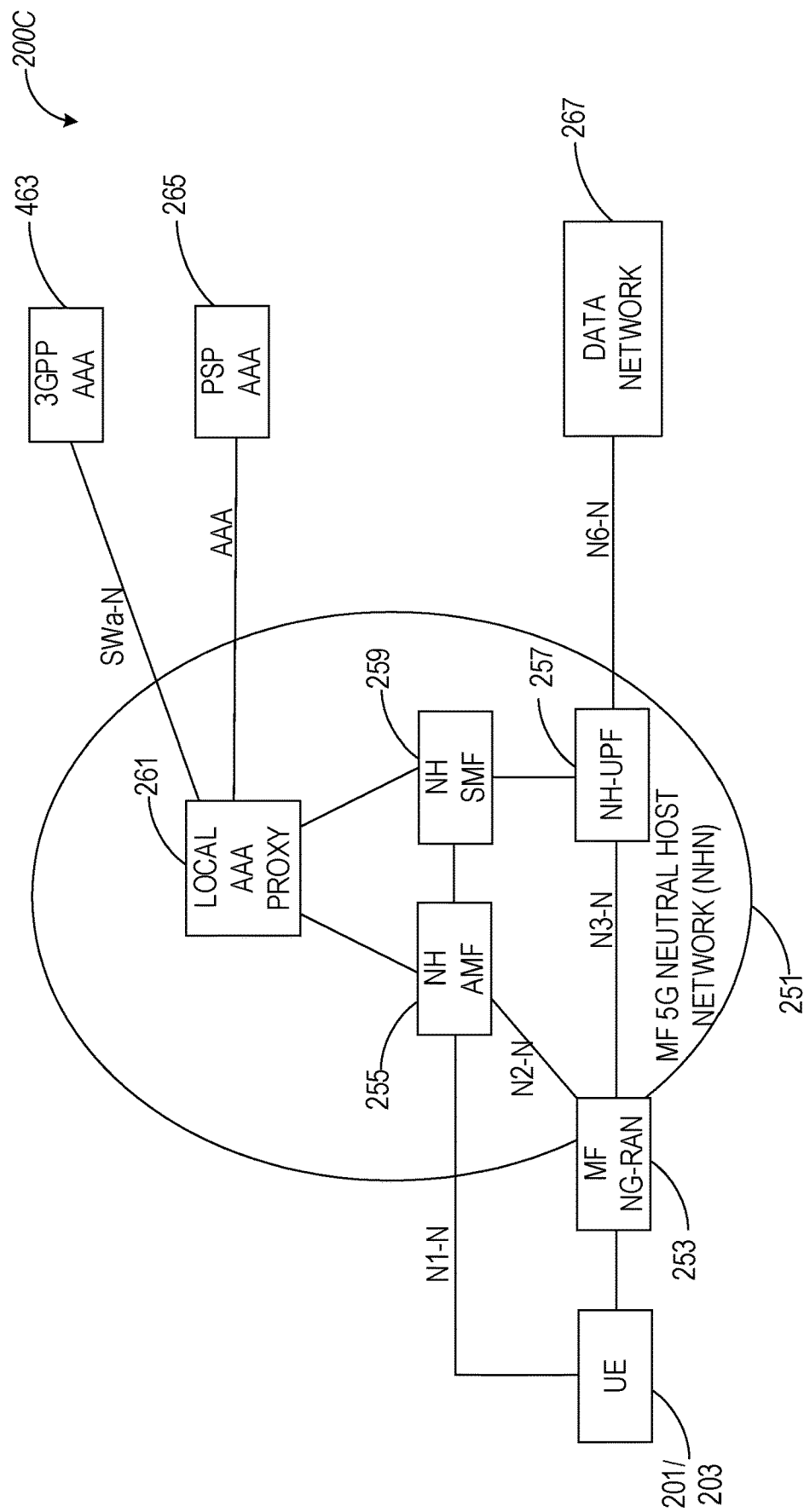
FIG. 2C illustrates an example MulteFire Neutral Host Network (NHN) 5G architecture in accordance with some aspects.

FIG. 2C illustrates an example MulteFire Neutral Host Network (NHN) 5G architecture 200C in accordance with some aspects. Referring to FIG. 2C, in some aspects, the MulteFire 5G architecture 200C can include a wireless communication device, such as a UE (e.g., UE 201/203), a NG-RAN (e.g., NG-RAN 239 or similar) and a core network (e.g., core network 241 or similar). The NG-RAN can be a MulteFire NG-RAN (MF NG-RAN) 253, and the core network can be a MulteFire 5G neutral host network (NHN) 251. In some aspects, the MF NHN 251 can include a neutral host AMF (NH AMF) 255, a NH SMF 259, a NH UPF 257, and a local Authentication, Authorization and Accounting (AAA) proxy 261. The AAA proxy 261 can provide connection to a 3GPP AAA server 263 and a participating service provider AAA (PSP AAA) server 265. The NH-UPF 257 can provide a connection to a data network 267.

The MF NG-RAN 253 can provide similar functionalities as an NG-RAN operating under a 3GPP specification. The NH-AMF 255 can be configured to provide similar functionality as an AMF in a 3GPP 5G core network (e.g., described further in reference to FIG. 2D). The NH-SMF 259 can be configured to provide similar functionality as a SMF in a 3GPP 5G core network (e.g., described further in reference to FIG. 2D). The NH-UPF 257 can be configured to provide similar functionality as a UPF in a 3GPP 5G core network (e.g., described further in reference to FIG. 2D).

Figure 2D:
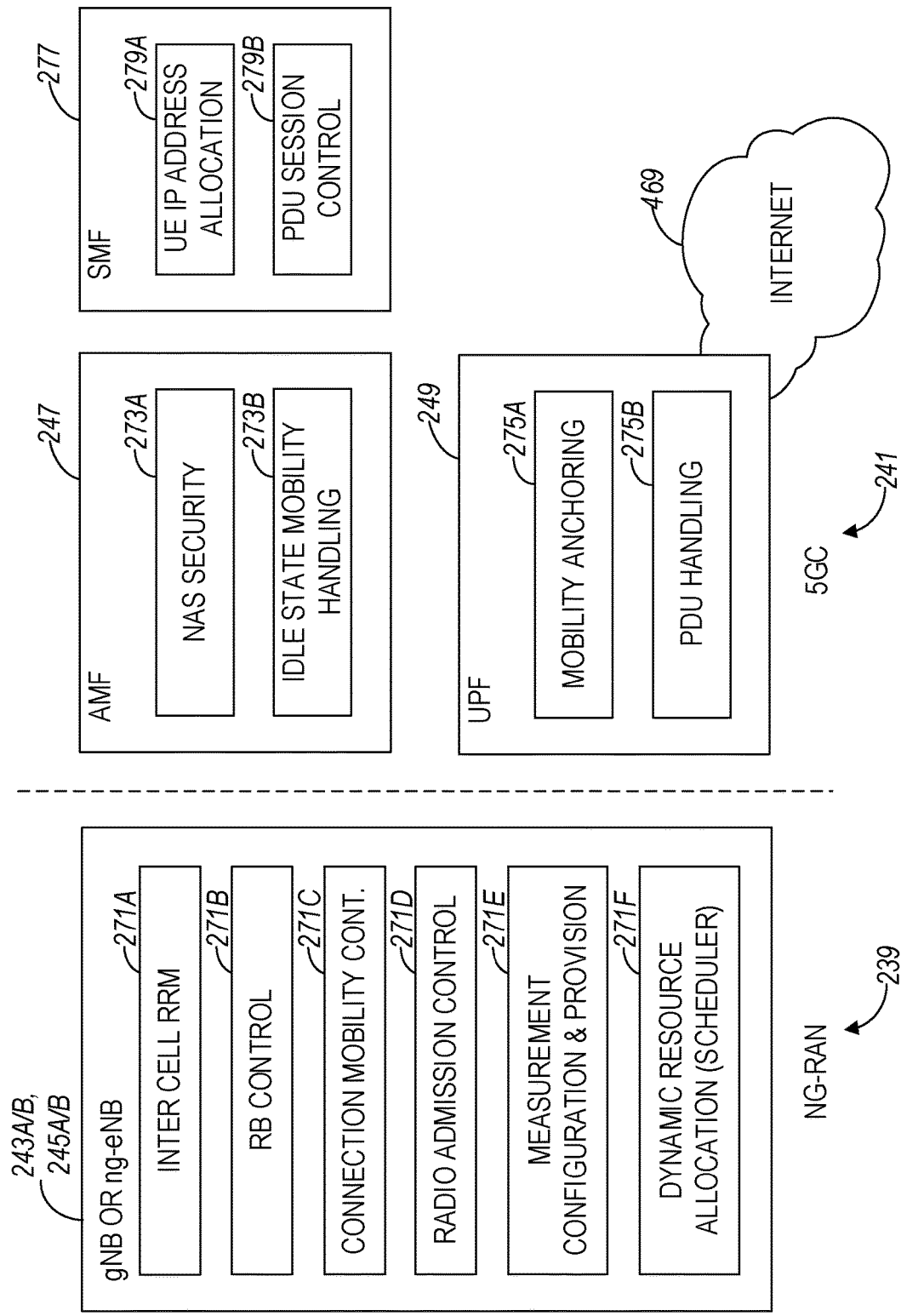
FIG. 2D illustrates an exemplary functional split between next generation radio access network (NG-RAN) and the 5G Core network (5GC) in accordance with some aspects.

FIG. 2D illustrates a functional split between a NG-RAN (e.g., NG-RAN 239) and a 5G Core (e.g., 5GC 241) in accordance with some aspects. FIG. 2D illustrates some of the functionalities the gNBs 243A/243B and the NG-eNBs 245A/245B can perform within the NG-RAN 239, as well as the AMF 247, the UPF 249, and a Session Management Function (SMF) 277 within the 5GC 241. In some aspects, the 5GC 241 can provide access to the Internet 269 to one or more devices via the NG-RAN 239.

In some aspects, the gNBs 243A/243B and the NG-eNBs 245A/245B can be configured to host the following functions: functions for Radio Resource Management (e.g., inter-cell radio resource management 271A, radio bearer control 271B, connection mobility control 271C, radio admission control 271D, dynamic allocation of resources to UEs in both uplink and downlink (scheduling) 271F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 271E; transport level packet marking in the uplink; session management; support of network slicing; QoS flow management and mapping to data radio bearers; support of UEs in RRC INACTIVE state; distribution function for non-access stratum (NAS) messages; radio access network sharing; dual connectivity; and tight interworking between NR and E-UTRA, to name a few.

In some aspects, the AMF 247 can be configured to host the following functions, for example: NAS signalling termination; NAS signalling security 279A; access stratum (AS) security control; inter core network (CN) node signalling for mobility between 3GPP access networks; idle state/ mode mobility handling 279B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 249 can be configured to host the following functions, for example: mobility anchoring 275A (e.g., anchor point for Intra-/Inter-RAT mobility); packet data unit (PDU) handling 275B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions. The Session Management function (SMF) 277 can be configured to host the following functions, for example: session management; UE IP address allocation and management 279A; selection and control of user plane function (UPF); PDU session control 279B, including configuring traffic steering at UPF 249 to route traffic to proper destination; control part of policy enforcement and QoS; or downlink data notification, among other functions.

Figure 2E:
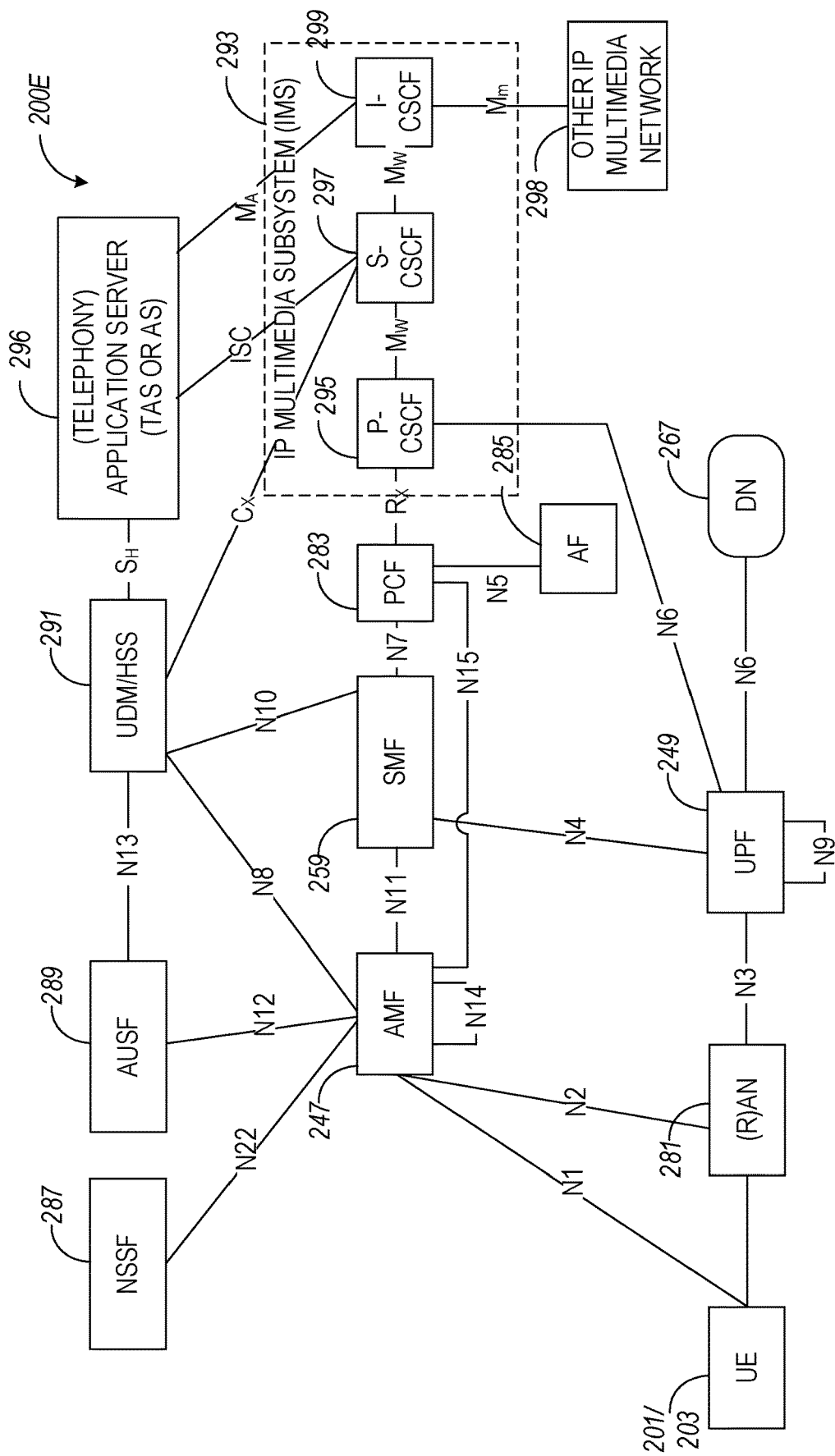
FIG. 2E illustrates an exemplary non-roaming 5G system architecture in accordance with some aspects.
Figure 2F:
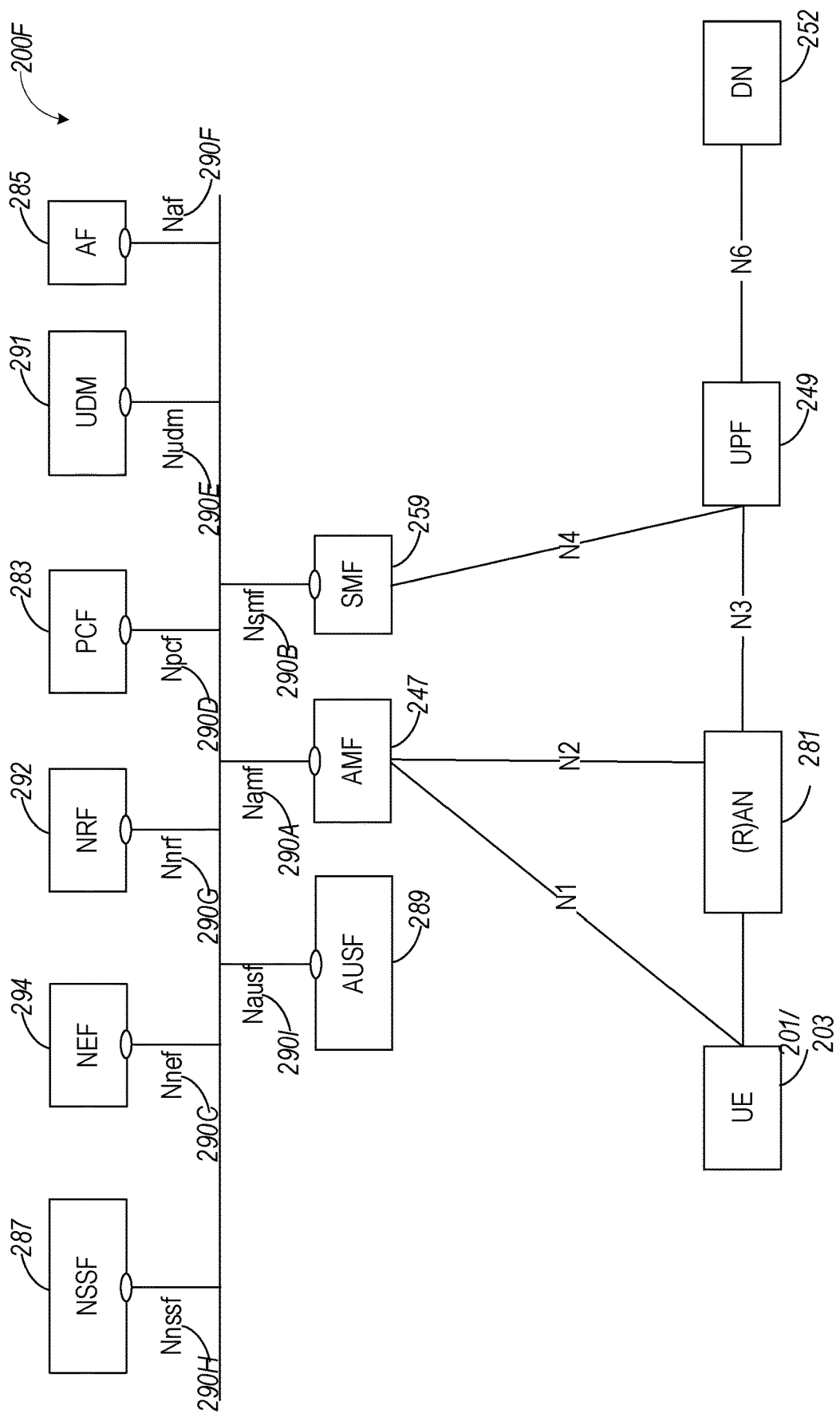
FIG. 2F illustrates an exemplary non-roaming 5G system architecture in accordance with some aspects.

FIG. 2E and FIG. 2F illustrate a non-roaming 5G system architecture in accordance with some aspects. Referring to FIG. 2E, an exemplary 5G system architecture 200E in a reference point representation is illustrated. More specifically, UE 201/203 can be in communication with RAN 281 as well as one or more other 5G core (5GC) network entities. The 5G system architecture 200E includes a plurality of network functions (NFs), such as access and mobility management function (AMF) (e.g., 247), session management function (SMF) (e.g., 259), policy control function (PCF) 283, application function (AF) 285, user plane function (UPF) (e.g., 249), network slice selection function (NSSF) 287, authentication server function (AUSF) 289, and unified data management (UDM)/home subscriber server (HSS) 291. The UPF 249 can provide a connection to a data network (DN) (e.g., 267), which can include, for example, operator services, Internet access, or third-party services. The AMF 247 can be used to manage access control and mobility and can also include network slice selection functionality. The SMF 259 can be configured to set up and manage various sessions according to a network policy. The UPF 249 can be deployed in one or more configurations according to a desired service type. The PCF 283 can be configured to provide a policy framework using network slicing, mobility management, and roaming (similar to PCRF in a 4G communication system). The UDM 291 can be configured to store subscriber profiles and data (similar to an HSS in a 4G communication system).

In some aspects, the 5G system architecture 200E includes an IP multimedia subsystem (IMS) 293 as well as a plurality of IP multimedia core network subsystem entities, such as call session control functions (CSCFs). More specifically, the IMS 293 includes a CSCF, which can act as a proxy CSCF (P-CSCF) 295 a serving CSCF (S-CSCF) 297, an emergency CSCF (E-CSCF) (not illustrated in FIG. 2E), or interrogating CSCF (I-CSCF) 299. The P-CSCF 295 can be configured to be the first contact point for the UE 201/203 within the IM subsystem (IMS) 293. The S-CSCF 297 can be configured to handle the session states in the network, and the E-CSCF can be configured to handle certain aspects of emergency sessions such as routing an emergency request to the correct emergency center or public safety answering point (PSAP). The I-CSCF 299 can be configured to function as the contact point within an operator's network for all IMS connections destined to a subscriber of that network operator, or a roaming subscriber currently located within that network operator's service area. In some aspects, the I-CSCF 299 can be connected to another IP multimedia network 298, (e.g. an IMS operated by a different network operator).

In some aspects, the UDM/HSS 291 can be coupled to an application server 296, which can include a telephony application server (TAS) or another application server (AS). The AS 296 can be coupled to the IMS 293 via the S-CSCF 297 or the I-CSCF 299. In some aspects, the 5G system architecture 200E can use a unified access barring mechanism using one or more of the techniques described herein, which access barring mechanism can be applicable for all RRC states of the UE 201/203, such as RRC_IDLE, RRC_CONNECTED, and RRC_INACTIVE states.

In some aspects, the 5G system architecture 200E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

FIG. 2F illustrates an exemplary 5G system architecture 200F and a service-based representation. System architecture 200F can be substantially similar to (or the same as) system architecture 200E. In addition to the network entities illustrated in FIG. 2E, system architecture 200F can also include a network exposure function (NEF) 294 and a network repository function (NRF) 292. In some aspects, 5G system architectures can be service-based and interaction between network functions can be represented by corresponding point-to-point reference points Ni (as illustrated in FIG. 2E) or as service-based interfaces (as illustrated in FIG. 2F).

A reference point representation shows that an interaction can exist between corresponding NF services. For example, FIG. 2E illustrates the following reference points: N1 (between the UE 201/203 and the AMF 247), N2 (between the RAN 281 and the AMF 247), N3 (between the RAN 281 and the UPF 249), N4 (between the SMF 259 and the UPF 249), N5 (between the PCF 283 and the AF 285), N6 (between the UPF 249 and the DN 252), N7 (between the SMF 259 and the PCF 283), N8 (between the UDM 291 and the AMF 247), N9 (between two UPFs 249, additional UPF not shown), N10 (between the UDM 291 and the SMF 259), N11 (between the AMF 247 and the SMF 259), N12 (between the AUSF 289 and the AMF 247), N13 (between the AUSF 289 and the UDM 291), N14 (between two AMFs 247, additional AMF not shown), N15 (between the PCF 283 and the AMF 247 in case of a non-roaming scenario, or between the PCF 283 and a visited network and AMF 247 in case of a roaming scenario, not shown), N16 (between two SMFs; not illustrated in FIG. 2E), and N22 (between AMF 247 and NSSF 287, not shown). Other reference point representations not shown in FIG. 2E can also be used.

In some aspects, as illustrated in FIG. 2F, service-based representations can be used to represent network functions within the control plane that enable other authorized network functions to access their services. In this regard, 5G system architecture 200F can include the following service-based interfaces: Namf 290A (a service-based interface exhibited by the AMF 247), Nsmf 290B (a service-based interface exhibited by the SMF 259), Nnef 290C (a service-based interface exhibited by the NEF 294), Npcf 290D (a service-based interface exhibited by the PCF 283), a Nudm 290E (a service-based interface exhibited by the UDM 291), Naf 290F (a service-based interface exhibited by the AF 285), Nnrf 290G (a service-based interface exhibited by the NRF 292), Nnssf 290H (a service-based interface exhibited by the NSSF 287), Nausf 290I (a service-based interface exhibited by the AUSF 289). Other service-based interfaces (e.g., Nudr, N5g-eir, and Nudsf) not shown in FIG. 2F can also be used.

Figure 2G:
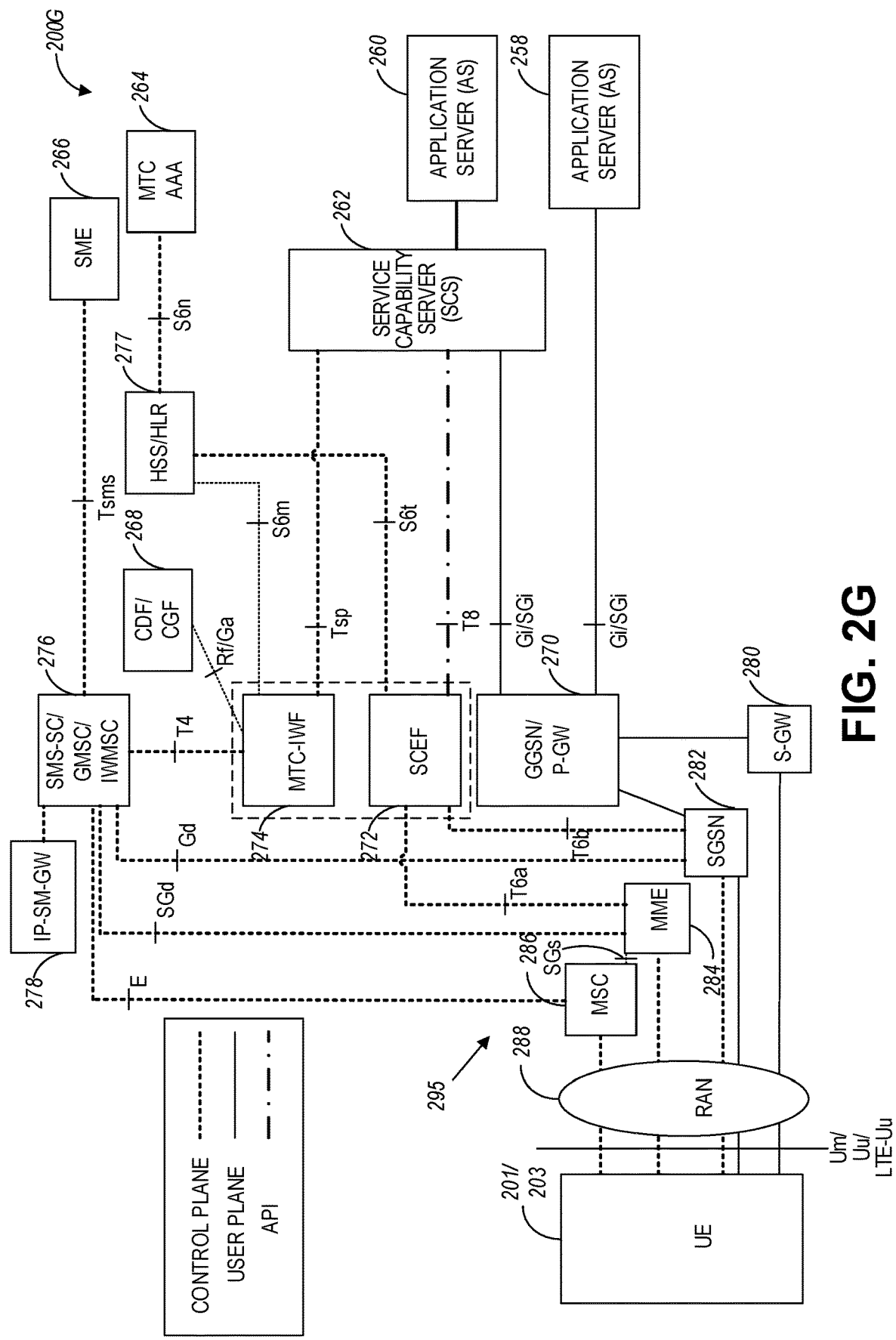
FIG. 2G illustrates an example Cellular Internet-of-Things (CIoT) network architecture in accordance with some aspects.

FIG. 2G illustrates an exemplary consumer IoT (CIoT) network architecture in accordance with some aspects. Referring to FIG. 2G, the CIoT architecture 200G can include the UE 201/203 and the RAN 288 coupled to a plurality of core network entities. In some aspects, the UE 201/203 can be a machine-type communication (MTC) UE. The CIoT network architecture 200G can further include a mobile services switching center (MSC) 286, MME 284, a serving GPRS support note (SGSN) 282, a S-GW 280, an IP-Short-Message-Gateway (IP-SM-GW) 278, a Short Message Service-Service Center (SMS-SC)/gateway mobile service center (GMSC)/Interworking MSC (IWMSC) 276, MTC interworking function (MTC-IWF) 274, a Service Capability Exposure Function (SCEF) 272, a gateway GPRS support node (GGSN)/Packet-GW (P-GW) 270, a charging data function (CDF)/charging gateway function (CGF) 268, a home subscriber server (HSS)/a home location register (HLR) 277, short message entities (SME) 266, MTC authorization, authentication, and accounting (MTC AAA) server 264, a service capability server (SCS) 262, and application servers (AS) 260 and 258. In some aspects, the SCEF 272 can be configured to securely expose services and capabilities provided by various 3GPP network interfaces. The SCEF 272 can also provide means for the discovery of the exposed services and capabilities, as well as access to network capabilities through various network application programming interfaces (e.g., API interfaces to the SCS 262).

FIG. 2G further illustrates various reference points between different servers, functions, or communication nodes of the CIoT network architecture 200G. Some example reference points related to MTC-IWF 274 and SCEF 272 include the following: Tsms (a reference point used by an entity outside the 3GPP network to communicate with UEs used for MTC via SMS), Tsp (a reference point used by a SCS to communicate with the MTC-IWF related control plane signalling), T4 (a reference point used between MTC-IWF 274 and the SMS-SC 266 in the HPLMN), T6a (a reference point used between SCEF 272 and serving MME 223), T6b (a reference point used between SCEF 272 and serving SGSN 260), T8 (a reference point used between the SCEF 272 and the SCS/AS 262/260), S6m (a reference point used by MTC-IWF 274 to interrogate HSS/HLR 277), S6n (a reference point used by MTC-AAA server 264 to interrogate HSS/HLR 277), and S6t (a reference point used between SCEF 272 and HSS/HLR 277).

In some aspects, the CIoT UE 201/203 can be configured to communicate with one or more entities within the CIoT architecture 200G via the RAN 288 (e.g., CIoT RAN) according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the CIoT UE 201/203 and an Evolved Packet System (EPS) Mobile Management Entity (MME) 284 and SGSN 282. In some aspects, the CIoT network architecture 200G can include a packet data network, an operator network, or a cloud service network, having, for example, among other things, a Service Capability Server (SCS) 280, an Application Server (AS) 260, or one or more other external servers or network components.

The RAN 288 can be coupled to the HSS/HLR servers 277 and the AAA servers 264 using one or more reference points including, for example, an air interface based on an S6a reference point, and configured to authenticate/authorize CIoT UE 201/203 to access the CIoT network. The RAN 288 can be coupled to the CIoT network architecture 200G using one or more other reference points including, for example, an air interface corresponding to an SGi/Gi interface for 3GPP accesses. The RAN 288 can be coupled to the SCEF 272 using, for example, an air interface based on a T6a/T6b reference point, for service capability exposure. In some aspects, the SCEF 272 may act as an API GW towards a third-party application server such as AS 260. The SCEF 272 can be coupled to the HSS/HLR 277 and MTC AAA 264 servers using an S6t reference point, and can further expose an Application Programming Interface to network capabilities.

In certain examples, one or more of the CIoT devices disclosed herein, such as the CIoT UE 201/203, the CIoT RAN 288, etc., can include one or more other non-CIoT devices, or non-CIoT devices acting as CIoT devices, or having functions of a CIoT device. For example, the CIoT UE 201/203 can include a smart phone, a tablet computer, or one or more other electronic device acting as a CIoT device for a specific function, while having other additional functionality. In some aspects, the RAN 288 can include a CIoT enhanced Node B (CIoT eNB) (not shown in FIG. 2G) communicatively coupled to the CIoT Access Network Gateway (CIoT GW) 295. In certain examples, the RAN 288 can include multiple base stations (e.g., CIoT eNBs) connected to the CIoT GW 295, which can include MSC 286, MME 284, SGSN 282, or S-GW 280. In certain examples, the internal architecture of RAN 288 and CIoT GW 295 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 2H:
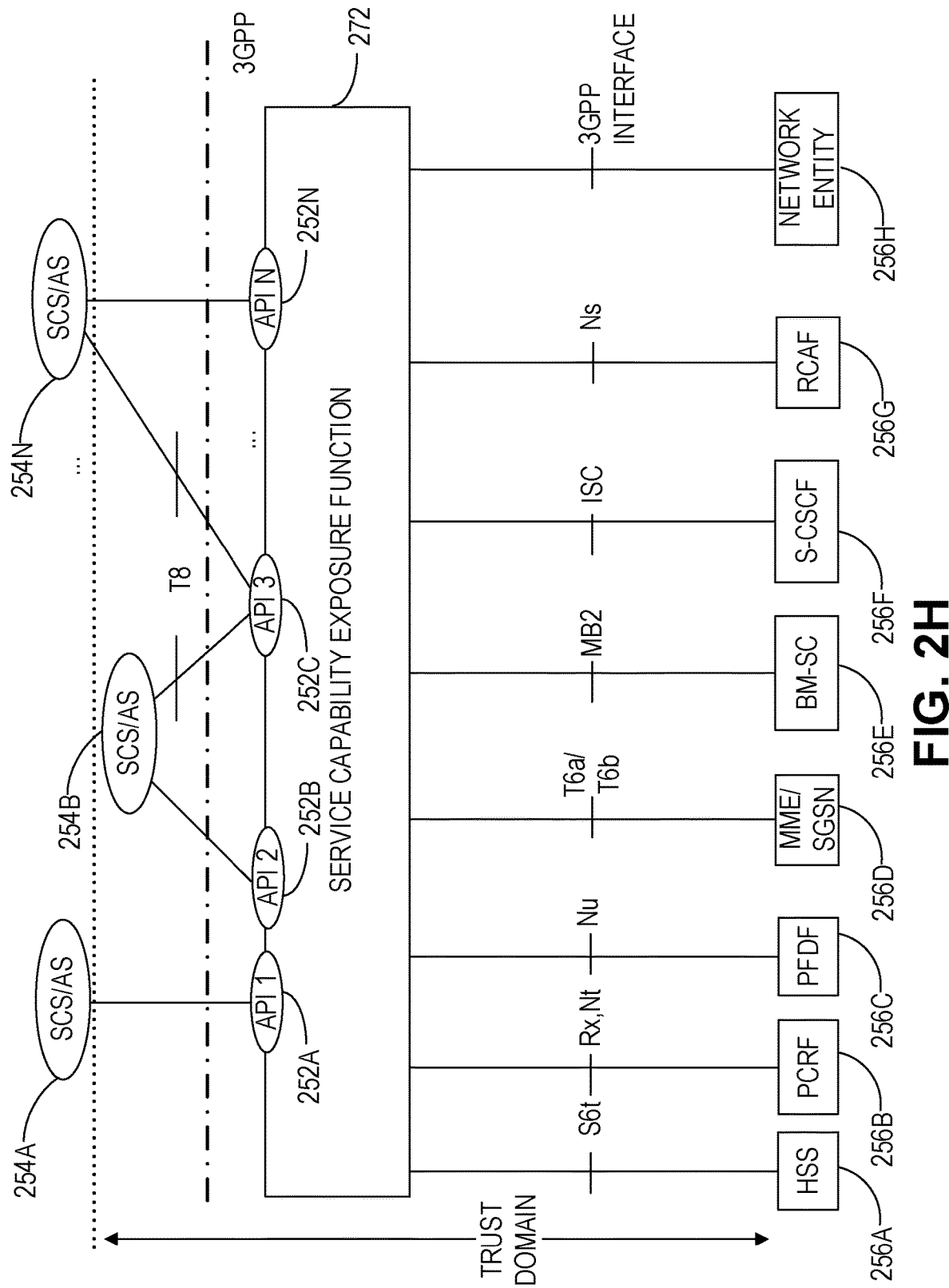
FIG. 2H illustrates an example Service Capability Exposure Function (SCEF) in accordance with some aspects.

FIG. 2H illustrates an example Service Capability Exposure Function (SCEF) in accordance with some aspects. Referring to FIG. 2H, the SCEF 272 can be configured to expose services and capabilities provided by 3GPP network interfaces to external third party service provider servers hosting various applications. In some aspects, a 3GPP network such as the CIoT architecture 200G, can expose the following services and capabilities: a home subscriber server (HSS) 256A, a policy and charging rules function (PCRF) 256B, a packet flow description function (PFDF) 256C a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 272 via one or more interfaces as illustrated in FIG. 2H. The SCEF 272 can be configured to expose the 3GPP network services and capabilities to one or more applications running on one or more service capability server (SCS)/application server (AS), such as SCS/AS 254A, 254B, . . . , 254N. Each of the SCS/AG 254A-254N can communicate with the SCEF 272 via application programming interfaces (APIs) 252A, 252B, 252C, . . . , 252N, as seen in FIG. 2H.

Figure 2I:
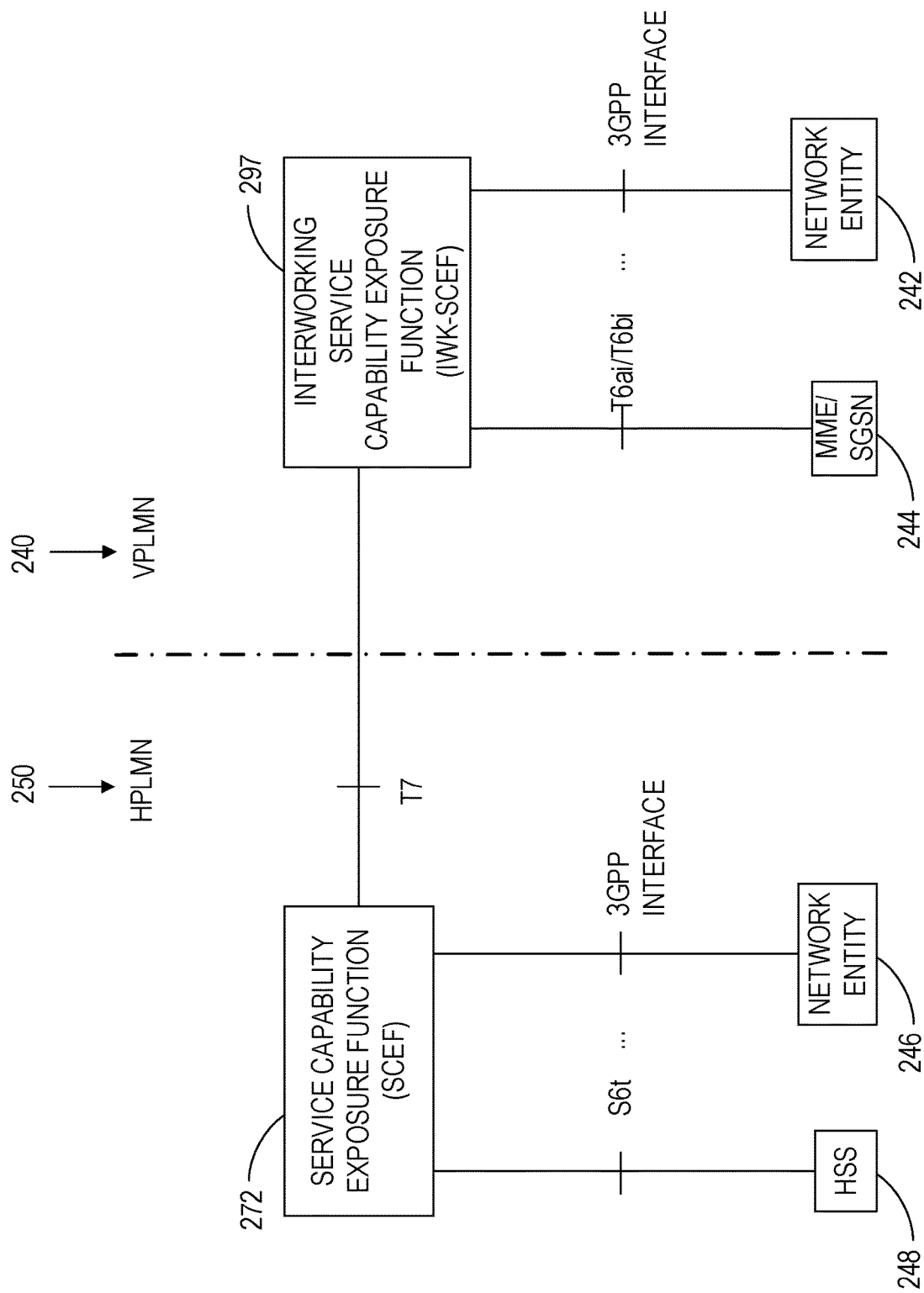
FIG. 2I illustrates an example roaming architecture for SCEF in accordance with some aspects.

FIG. 2I illustrates an example roaming architecture for SCEF (e.g., 272) in accordance with some aspects. Referring to FIG. 2I, the SCEF 272 can be located in HPLMN 250 and can be configured to expose 3GPP network services and capabilities, such as 248, . . . , 246. In some aspects, 3GPP network services and capabilities, such as 244, . . . , 242, can be located within VPLMN 240. In this case, the 3GPP network services and capabilities within the VPLMN 240 can be exposed to the SCEF 272 via an interworking SCEF (IWK-SCEF) 297 within the VPLMN 240.

Figure 2J:
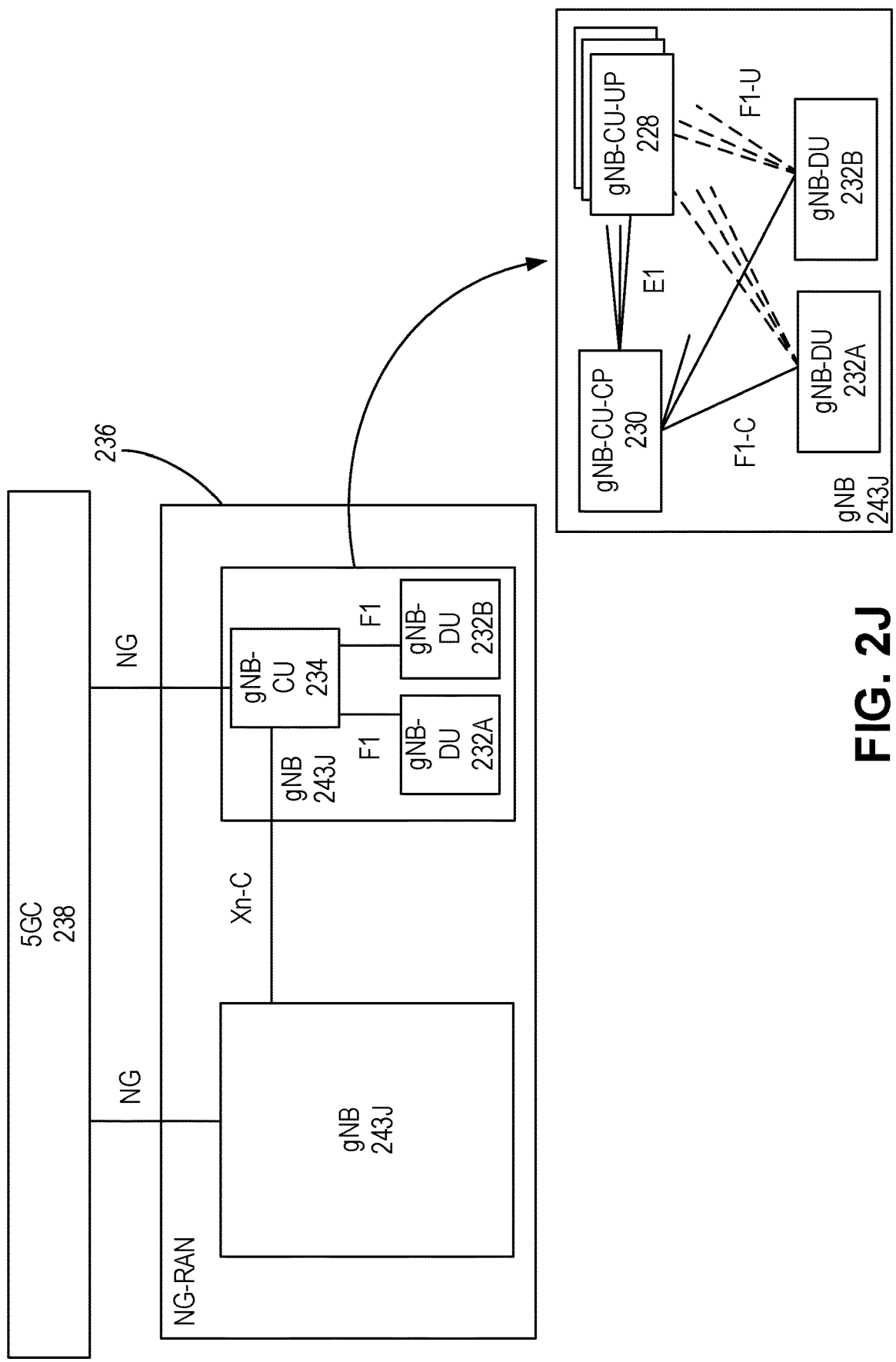
FIG. 2J illustrates components of an exemplary NG Radio Access Network (RAN) architecture, in accordance with some aspects.

FIG. 2J illustrates an exemplary Next-Generation Radio Access Network architecture, in accordance with some aspects. The 5GC 238, the NG-RAN 236, and the gNBs 243J, in some aspects, may be similar or the same as the 5GC 220, the NG-RAN 236, and the gNBs 243A/243B of FIG. 2B, respectively. In some aspects, network elements of the NG-RAN 236 may be split into central and distributed units, and different central and distributed units, or components of the central and distributed units, may be configured for performing different protocol functions. For example, different protocol functions of the protocol layers depicted in FIG. 4, FIG. 7, or FIG. 8.

In some aspects, the gNB 243J can comprise or be split into one or more of a gNB Central Unit (gNB-CU) 234 and a gNB Distributed Unit (gNB-DU) 232A/232B. Additionally, the gNB 243J can comprise or be split into one or more of a gNB-CU-Control Plane (gNB-CU-CP) 230 and a gNB-CU-User Plane (gNB-CU-UP) 228. The gNB-CU 234 is a logical node configured to host the radio resource control layer (RRC), service data adaptation protocol (SDAP) layer and packet data convergence protocol layer (PDCP) protocols of the gNB or RRC, and PDCP protocols of the E-UTRA-NR gNB (en-gNB) that controls the operation of one or more gNB-DUs. The gNB-DU 232A/232B is a logical node configured to host the radio link control layer (RLC), medium access control layer (MAC) and physical layer (PHY) layers of the gNB 243A/243B, 243J or en-gNB, and its operation is at least partly controlled by gNB-CU 234. In some aspects, one gNB-DU 232A/232B can support one or multiple cells.

The gNB-CU 234 comprises a gNB-CU-Control Plane (gNB-CU-CP) 230 and a gNB-CU-User Plane (gNB-CU-UP) 228. The gNB-CU-CP 230 is a logical node configured to host the RRC and the control plane part of the PDCP protocol of the gNB-CU 234 for an en-gNB or a gNB. The gNB-CU-UP 228 is a logical node configured to host the user plane part of the PDCP protocol of the gNB-CU 234 for an en-gNB, and the user plane part of the PDCP protocol and the SDAP protocol of the gNB-CU 234 for a gNB.

The gNB-CU 234 and the gNB-DU 232A/232B can communicate via the F1 interface and the gNB 243J can communicate with the gNB-CU via the Xn-C interface. The gNB-CU-CP 230 and the gNB-CU-UP 228 can communicate via the E1 interface. Additionally, the gNB-CU-CP 230 and the gNB-DU 232A/232B can communicate via the F1-C interface, and the gNB-DU 232A/232B and the gNB-CU-UP 228 can communicate via the F1-U interface.

In some aspects, the gNB-CU 234 terminates the F1 interface connected with the gNB-DU 232A/232B, and in other aspects, the gNB-DU 232A/232B terminates the F1 interface connected with the gNB-CU 234. In some aspects, the gNB-CU-CP 230 terminates the E1 interface connected with the gNB-CU-UP 228 and the F1-C interface connected with the gNB-DU 232A/232B. In some aspects, the gNB-CU-UP 228 terminates the E1 interface connected with the gNB-CU-CP 230 and the F1-U interface connected with the gNB-DU 232A/232B.

In some aspects, the F1 interface is a point-to-point interface between endpoints and supports the exchange of signalling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP 230 and a gNB-CU-UP 228 and supports the exchange of signalling information between endpoints. The E1 interface can separate the Radio Network Layer and the Transport Network Layer, and in some aspects, the E1 interface may be a control interface not used for user data forwarding.

Referring to the NG-RAN 236, the gNBs 243J of the NG-RAN 236 may communicate to the 5GC via the NG interfaces, and interconnected to other gNBs via the Xn interface. In some aspects, the gNBs 243J (e.g., 243A/243B) can be configured to support FDD mode, TDD mode or dual mode operation. In certain aspects, for EN-DC, the S1-U interface and an X2 interface (e.g., X2-C interface) for a gNB, consisting of a gNB-CU and gNB-DUs, can terminate in the gNB-CU.

Figure 3A:
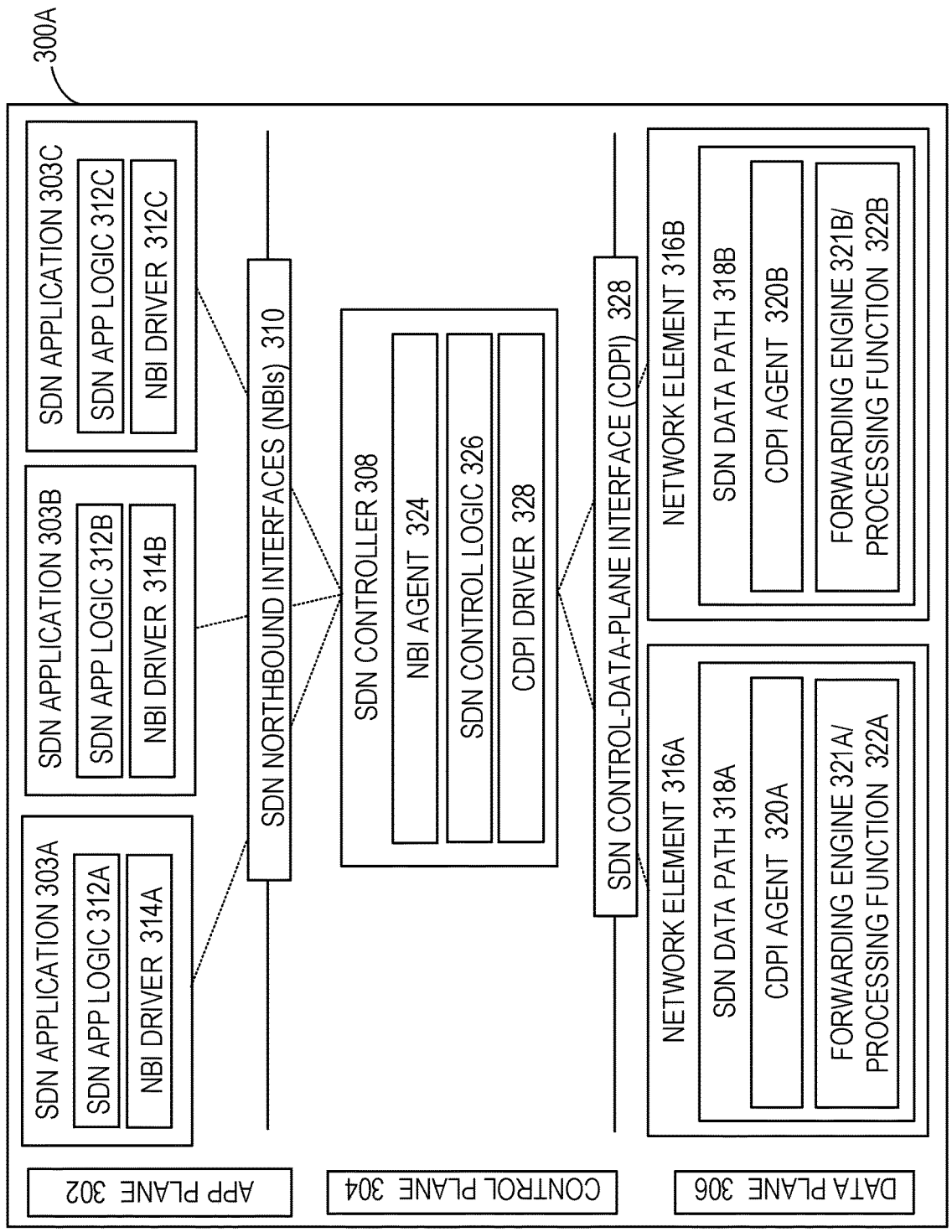
FIG. 3A is a block diagram of an exemplary SDN architecture, in accordance with some aspects.

FIG. 3A is a block diagram of an SDN architecture 300A, in accordance with some aspects. The SDN architecture 300A can be implemented within any of the systems shown in FIG. 1 or 2A-2J, and can be configured for SDN-based or NFV-based measurement and filtering operations and/or filtering coefficient signalling methods described herein. The SDN architecture 300A comprises an application plane 302, a control plane 304, and a data plane 306. The application plane 302 may include one or more SDN applications (e.g., 303A, 303B, 303C), the SDN control plane 304 can include a network controller (e.g., SDN controller 308), and the SDN data plane 306 can include one or more network elements 316A and 316B. Some non-limiting examples of SDN applications 303A-303C can include software-defined mobile networking (SDMN), software-defined wide area network (SD-WAN), software-defined local area network (SD-LAN), network-related security applications, and distributed applications for group data delivery.

In some aspects, the SDN applications 303A-303C may be programs that can directly communicate in a programmatic manner to the SDN controller 308, for example, to communicate network requirements and desired network behavior. The SDN applications 503A-C can communicate with the SDN controller 308 via a northbound interface (NBI) 310. The SDN applications 503A-C can make decisions and determine operations, for example, based on an abstracted view of a network. In some aspects, an SDN application 503A-C comprises SDN application logic 312 and one or more NBI drivers 514.

The SDN controller 308 is a centralized logic entity that can coordinate communications and requested information from the SDN application plane 302 to the SDN data plane 306. The SDN controller 308 can provide an abstracted view of the network to an SDN application 303, and this abstracted view may include information describing certain network events as well as statistics. The SDN controller 308 may comprise an NBI agent 324, SDN control logic 326, and a control-data-plane interface (CDPI) driver 328. The SDN controller 308 may communicate with the one or more network elements 316A-316B via the SDN CDPI 328. The SDN CDPI 328 can enable capabilities advertisement, statistics reporting, event notification, and programmatic control of forwarding operations.

A network element, for example, can be device within the network, such as a router, switch, RAN node, or a gateway. A network element 316 may comprise an SDN data path 318, a logical device of a network that includes forwarding and data processing capabilities. The SDN data path 318 can include an SDN CDPI agent 320, a forwarding engine 321, and a processing function 322, which can enable internal traffic processing or terminations for the network element 316 (e.g., SDN data path 318), and forwarding between external interfaces of the SDN data path 318. In certain aspects, the forwarding engine 321 and processing function 322 may be included in the SDN data path 318 as a set. The SDN data path 318 may comprise combined physical resources, such as circuitry, and one or more SDN data paths may be included within a single network element or defined across multiple network elements.

Figure 3B:
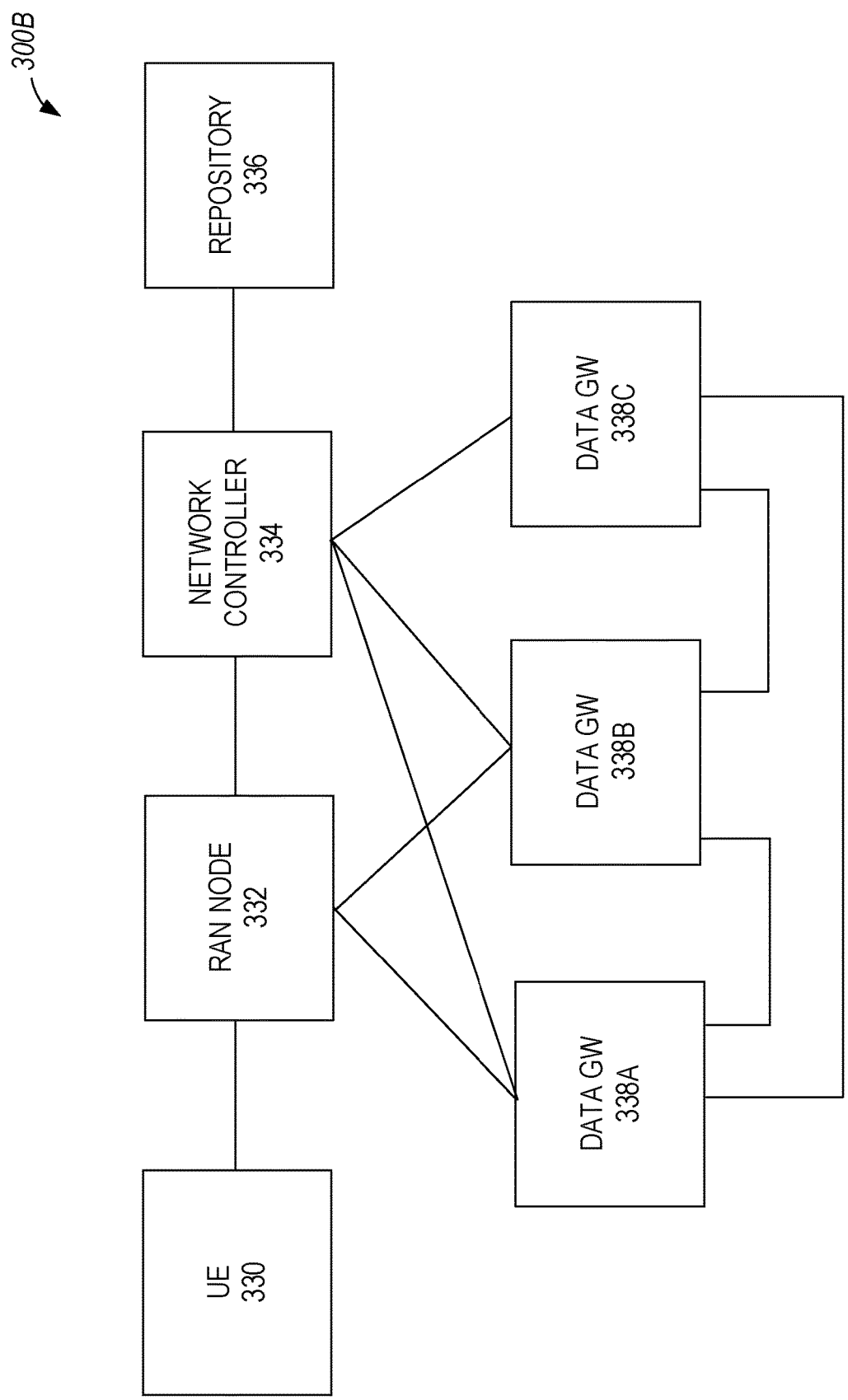
FIG. 3B is a block diagram of an exemplary SDN architecture, in accordance with some aspects.

FIG. 3B is a block diagram of an SDN architecture 300B, in accordance with some aspects. The SDN architecture 300B can be implemented within any of the systems shown in FIG. 1 or 2A-2J, and can be configured for SDN-based or NFV-based data measurement and filtering and/or filtering coefficient configuration operations. In some aspects, the UE 330 (e.g., UE 201/203) may communicate with a network (e.g., system 200A, system 200B, system 200C) to access various IP services. In some aspects, the architecture of the network can be SDN-based and configured to include a control plane separated from user plane entities or functions (e.g., network elements). A tunnel-less transmission can be used for provisioning IP services for various devices to reduce messaging overhead. The UE 330 can access the network via a RAN node 332. The RAN node 332 can communicate with a network controller 334 to request IP services provisioning for the UE 330. In certain aspects, the network controller 334 may be an SDN-based network controller. The network controller 334 can communicate with a repository 336 (e.g., subscription repository) to authenticate the UE 330, and the subscription repository 336 can be configured to store (e.g., in memory) device and service subscription information (e.g., device and service subscription information for the UE 330).

In various aspects, the RAN node 332, the network controller 334, or a combination of the RAN node 332 and the network controller 334, can provision a requested IP service (e.g., requested by the UE 330). IP service provisioning can include allocating a group of IP addresses. For example, a pool of IPv4 addresses or an IPv6 prefix may be allocated for a requested IP service. In some aspects, a mobile network operator (MNO) can preconfigure the group of IP addresses. The preconfigured group of IP addresses may be stored, for example, within memory of one or more of the subscription repository 336, the network controller 334, or the RAN node 332. If the RAN node 332 allocates the group of IP addresses, the RAN node 332 may request the group of IP addresses from the network controller 334.

The network controller 334 can request the group of IP addresses from the subscription repository 336. A device, such as the RAN node 332, network controller 334, or a router can identify a requested IP service by a group of IP addresses (e.g., the allocated group of IP addresses) and can use an IP address of a packet to identify a received packet and determine a routing policy for forwarding the packet to an appropriate data gateway (e.g., data gateway 338A, data gateway 338B, data gateway 338C), router, or an endpoint (e.g., 104B).

The network controller 334 can also configure devices, such as one or more data gateways (e.g., 338A, 338B, and 108) or routers (e.g., 106), for operations related to the requested IP service in a particular packet data network (PDN). For example, the network controller 334 can configure such devices with routing tables (e.g., flow tables, forwarding tables) for implementing a routing policy. In some aspects, the routing policies may be based on information regarding the PDN. As part of the data gateway configuration, the network controller 334 may provide routing policies to the RAN node 332, the data gateways, or the routers (e.g., 106). In some aspects, if the RAN node 332 receives the routing policies, the RAN node 332 may provide the routing policies to the data gateways.

In some aspects, the SDN architecture 300A can provide one or more network elements as virtualized services, for example, a controller (e.g., SDN controller), router, switch, RAN node, gateway, or various other network elements. These can be virtualized services of system 100 or systems 200A and 200B.

In some aspects, virtualized network elements can be implemented in different planes of the SDN architecture 300A. For example, the SDN architecture 300A can include a router (e.g., virtualized router), switch (e.g., virtualized switch), or other virtualized network elements that are implemented in the data plane 306 of the SDN architecture 300A. The SDN architecture 300A can also include a controller (e.g., SDN controller), or other virtualized network elements that are implemented in the control plane 304 of the SDN architecture 300A.

In some aspects, the SDN architecture 300A, including the virtualized network elements or services, can also provide virtualized network functions. Network function virtualization (NFV) can facilitate programmability and flexibility of network functions, such as functions performed by virtualized network elements (e.g., routers, switches, controllers, etc.). In some aspects, such virtualized functions can include measurement and filtering and/or filtering coefficient configuration operations, as described herein.

In an SDN (e.g., SDN architecture 300A), virtualized network elements in the control plane 304, such as the SDN controller, can maintain and configure a global state of the network. The virtualized network elements (e.g., virtualized network functions) in the data plane 306, such as a virtualized router or switch (e.g., virtualized router functionality or virtualized switching functionality), can operate as a data path configured for receiving data packets, identifying destination addresses for the data packets, and forwarding the data packets according to the identified destination addresses. In some aspects, such virtualized network elements can identify the destination addresses by referring to forwarding or routing tables that can include information that is structured according to routing policies and rules. Routing policies and rules may be established by network entities within the control plane, for example, the SDN controller. An example of a virtualized function that can be performed within the SDN architecture 300A or NFV system 1300 includes measurement and filtering and/or filtering coefficient configuration operations.

Figure 3C:
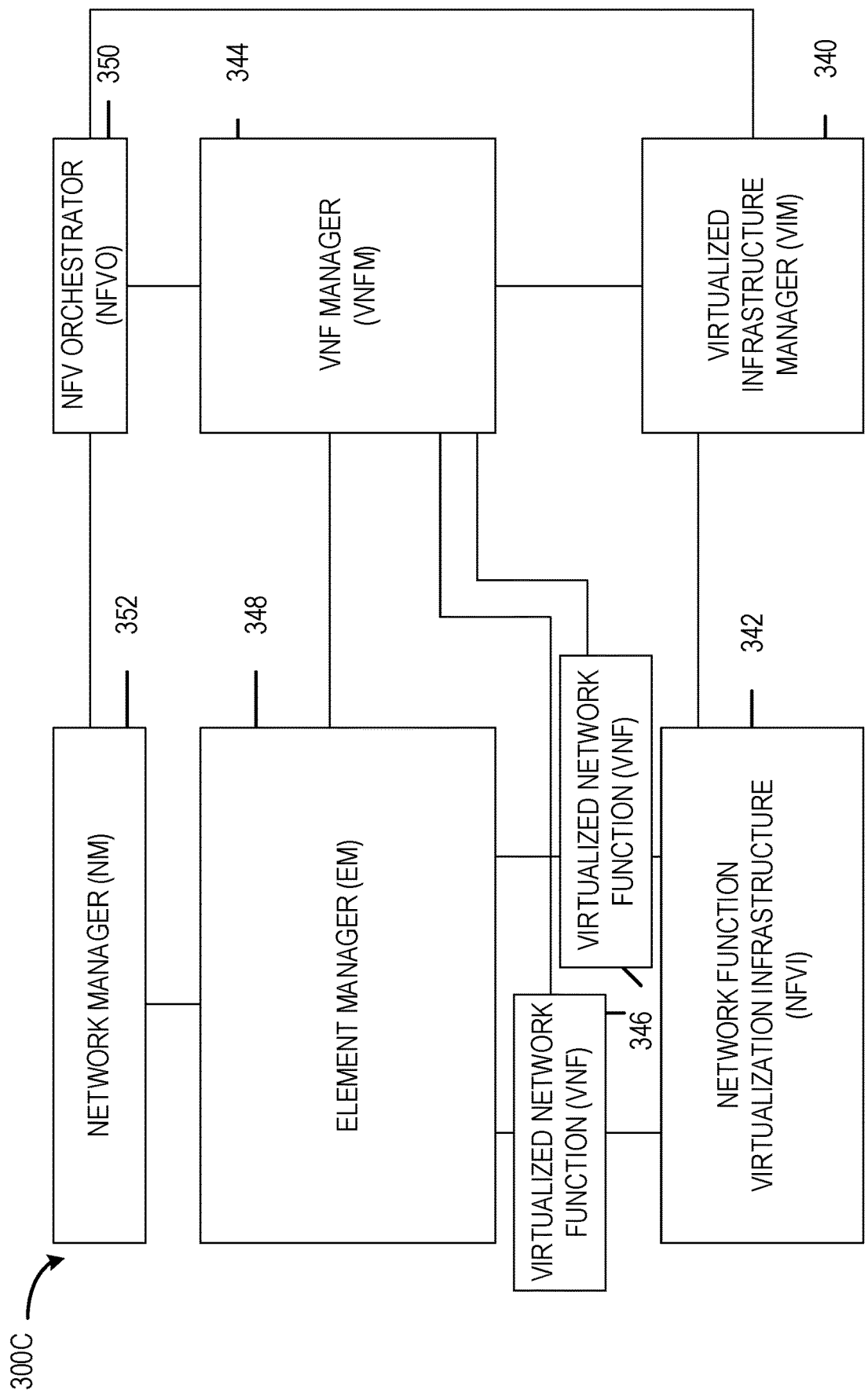
FIG. 3C is a block diagram illustrating components, according to some example aspects, of a system to support network function virtualization.

FIG. 3C is a block diagram illustrating components, according to some example aspects, of a system 300C to support NFV. The NFV system 300C, can include virtualized functions of the network entities of one or more of systems 100 or the systems shown in FIGS. 2A-2J. In some aspects, the NFV system 300C can include virtualized functions of the SDN network architecture of system 300A or 300B. Virtualized functions can include measurement and filtering operations and/or filtering coefficient signalling methods described herein.

The system 300C is illustrated as including a virtualized infrastructure manager (VIM) 340, a network function virtualization infrastructure (NFVI) 342, a VNF manager (VNFM) 344, virtualized network functions (VNFs) 346, an element manager (EM) 348, an NFV Orchestrator (NFVO) 350, and a network manager (NM) 352.

The VIM 340 manages the resources of the NFVI 342. The NFVI 342 can include physical or virtual resources and applications (e.g., including hypervisors) used to execute the system 300C. The VIM 340 can manage the life cycle of virtual resources with the NFVI 342 (e.g., creation, maintenance, and tear down of virtual machines (VMs) associated with one or more physical resources), track VM instances, track performance, fault and security of VM instances and associated physical resources, and expose VM instances and associated physical resources to other management systems. The VNFM 344 can manage the VNFs 346, and can configure and control network resources (e.g., in the SDN domain). The VNFs 346 can be used to execute EPC or 5GC components/functions and RAN components/functions. The VNFM 344 can manage the life cycle of the VNFs 346 and track performance, fault and security of the virtual aspects of VNFs 346. The EM 348 can track the performance, fault and security of the functional aspects of VNFs 346. The tracking data from the VNFM 344 and the EM 348 may comprise, for example, performance measurement (PM) data used by the VIM 340 or the NFVI 342. Both the VNFM 344 and the EM 348 can scale up/down the quantity of VNFs of the system 300C.

The NFVO 350 can coordinate, authorize, release and engage resources of the NFVI 342 in order to provide the requested service (e.g., to execute an EPC function, component, or slice). The NM 352 may provide a package of end-user functions with the responsibility for the management of a network, which may include network elements with VNFs, non-virtualized network functions, or both (management of the VNFs may occur via the EM 348). In some aspects, the VNFM 344 can manage virtualized functions of a network router or switch (e.g., router or switch 106A), and a network controller (e.g., SDN controller 308, network controller 334). In certain aspects, the virtualized router or switch functions can exist in the data plane of the SDN domain (e.g., data plane 306 in SDN architecture 300A) and the controller functions can exist in the control plane of the SDN domain (control plane 304 in SDN architecture 300A). In some aspects, the VNFM 344 can manage virtualized measurement and filtering operations and/or filtering coefficient signalling methods.

Figure 4:
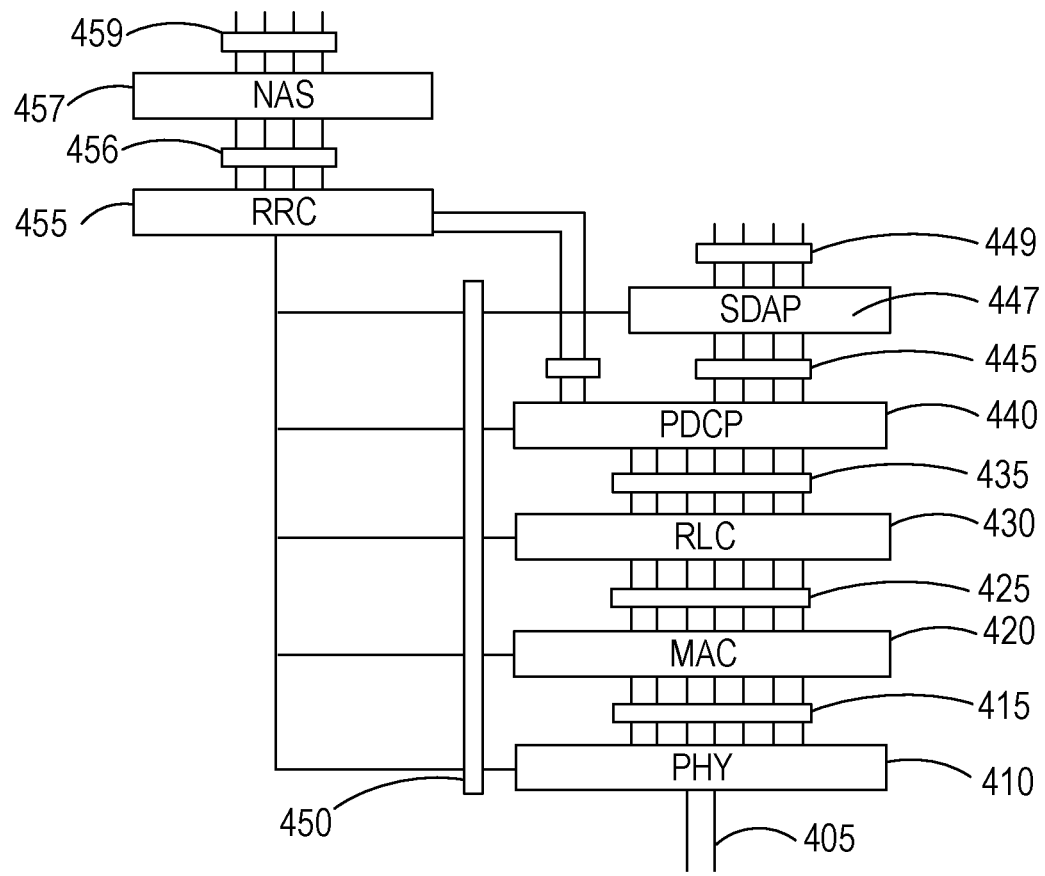
FIG. 4 is an illustration of an exemplary user plane protocol stack in accordance with some aspects.

FIG. 4 illustrates protocol functions that may be implemented within or by devices of a network architecture, in accordance with some aspects. For example, such protocol functions may be implemented within wireless communication devices such as UEs or BSs, and any other network entities configured for measurement and filtering operations and/or filtering coefficient signalling methods. In some aspects, protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated. In some aspects, the protocol layers may be implemented within or by any of the network components of FIGS. 2A-2J, such as the gNBs (e.g., 243A/243B, 243J), and various layers of the protocol functions may be implemented by one or more central or distributed units of the gNBs (e.g., gNB-CU 229J, gNB-DU 230J).

According to some aspects, protocol layers may include one or more service access points that may provide communication between two or more protocol layers. According to some aspects, PHY 410 may transmit and receive physical layer signals 405 that may be received or transmitted respectively by one or more other communication devices (e.g., UE 201, UE 201/203, device 500). According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels. According to some aspects, an instance of MAC 420 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels. According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows. According to some aspects, RRC entity 455 may configure, via one or more management service access points (M-SAP) 450, aspects of one or more protocol layers, which may include one or more instances of PHY 410, MAC 420, RLC 430, PDCP 440, and SDAP 447. According to some aspects, an instance of RRC 455 may process requests from and provide indications to one or more NAS 457 entities via one or more RRC service access points (RRC-SAP) 456. According to some aspects, a NAS entity 457 may process requests from and provide indications to one or more higher layer protocol entities via one or more NAS service access points (NAS-SAP) 459.

Figure 5:
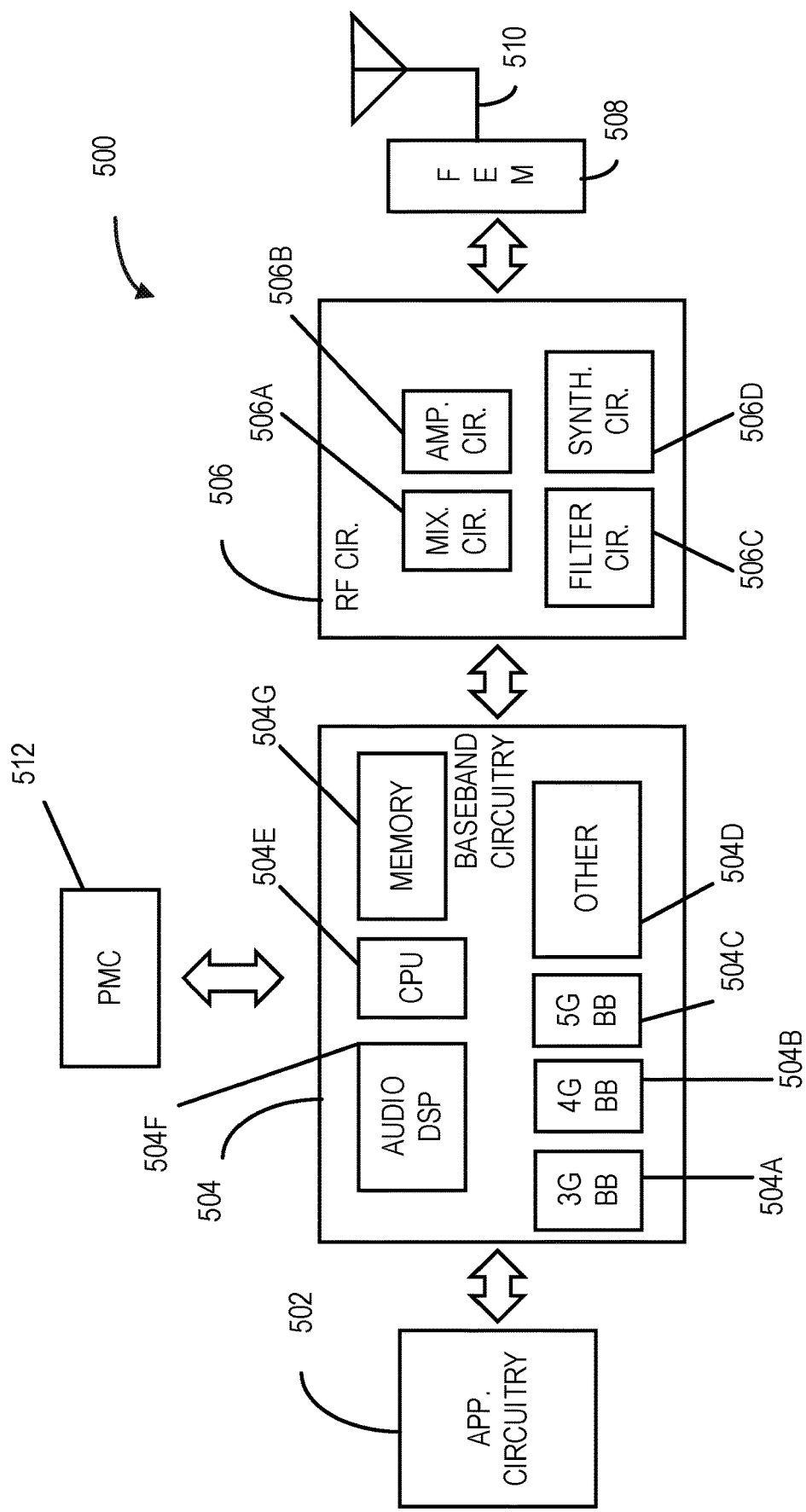
FIG. 5 illustrates example components of a device in accordance with some aspects.

FIG. 5 illustrates example components of a device 500 in accordance with some aspects. For example, the device 500 may be a device configured for measurement and filtering operations and/or filtering coefficient signalling methods (e.g., UE 201, UE 203, UE 460, RAN Node 213/215). In some aspects, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE (e.g., UE 201, UE 203, UE 460) or a RAN node (e.g., Macro RAN node 213, LP RAN node 215, gNB 480). In some aspects, the device 500 may include fewer elements (e.g., a RAN node may not utilize application circuitry 502, and instead may include a processor/controller to process IP data received from an EPC). In some aspects, the device 500 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some aspects, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some aspects, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506.

In other aspects, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some aspects, modulation/demodulation circuitry of the baseband circuitry 504 may include Fast-Fourier Transform (FFT), precoding, or constellation mapping/demapping functionality. In some aspects, encoding/decoding circuitry of the baseband circuitry 504 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 504 may include one or more audio digital signal processor(s) (DSP) 504F. The audio DSP(s) 504F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 504 and the application circuitry 502 may be implemented together such as, for example, on a system on a chip (SOC).

In some aspects, the baseband circuitry 504 may provide for communication compatible with one or more radio technologies. For example, in some aspects, the baseband circuitry 504 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various aspects, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some aspects, the receive signal path of the RF circuitry 506 may include mixer circuitry 506A, amplifier circuitry 506B and filter circuitry 506C. In some aspects, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some aspects, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some aspects, the output baseband signals may be zero-frequency baseband signals, although this is not a requirement. In some aspects, mixer circuitry 506A of the receive signal path may comprise passive mixers, although the scope of the aspects is not limited in this respect.

In some aspects, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by filter circuitry 506C. In some aspects, the mixer circuitry 506A of the receive signal path and the mixer circuitry 506A of the transmit signal path may include two or more mixers and may be arranged for quadrature down-conversion and up-conversion, respectively. In some aspects, the mixer circuitry 506A of the receive signal path and the mixer circuitry 506A of the transmit signal path may include two or more mixers and may be arranged for image rejection (e.g., Hartley image rejection). In some aspects, the mixer circuitry 506A of the receive signal path and the mixer circuitry 506A may be arranged for direct down-conversion and direct up-conversion, respectively. In some aspects, the mixer circuitry 506A of the receive signal path and the mixer circuitry 506A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode aspects, a separate radio IC circuitry may be provided for processing signals for each spectrum, although the scope of the aspects is not limited in this respect. In some aspects, the synthesizer circuitry 506D may be a fractional-N synthesizer or a fractional N/N+1 synthesizer, although the scope of the aspects is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider. The synthesizer circuitry 506D may be configured to synthesize an output frequency for use by the mixer circuitry 506A of the RF circuitry 506 based on a frequency input and a divider control input. In some aspects, the synthesizer circuitry 506D may be a fractional N/N+1 synthesizer.

In some aspects, frequency input may be provided by a voltage-controlled oscillator (VCO), although that is not a requirement. Divider control input may be provided by either the baseband circuitry 504 or the applications processor 502 depending on the desired output frequency. In some aspects, a divider control input (e.g., N) may be determined from a look-up table based on a channel indicated by the applications processor 502.

Synthesizer circuitry 506D of the RF circuitry 506 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 506D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency ($f_{LO}$). In some aspects, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various aspects, the amplification through the transmit or receive signal paths may be done solely in the RF circuitry 506, solely in the FEM 508, or in both the RF circuitry 506 and the FEM 508.

In some aspects, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some aspects, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other aspects, the PMC 512 may be additionally or alternatively coupled with, and perform similar power management operations for, other components such as, but not limited to, application circuitry 502, RF circuitry 506, or FEM 508.

In some aspects, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Figure 7:
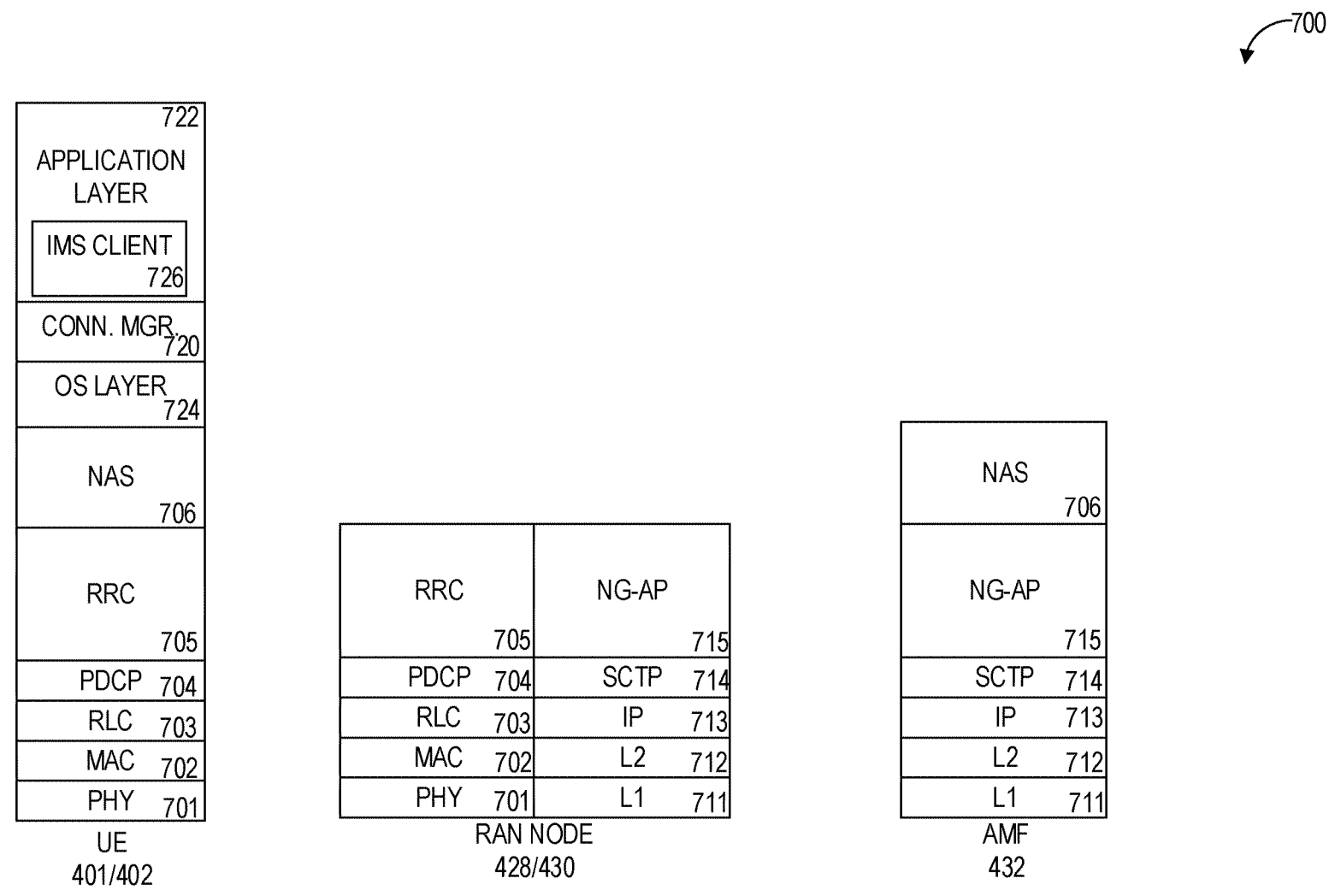
Figure 8:
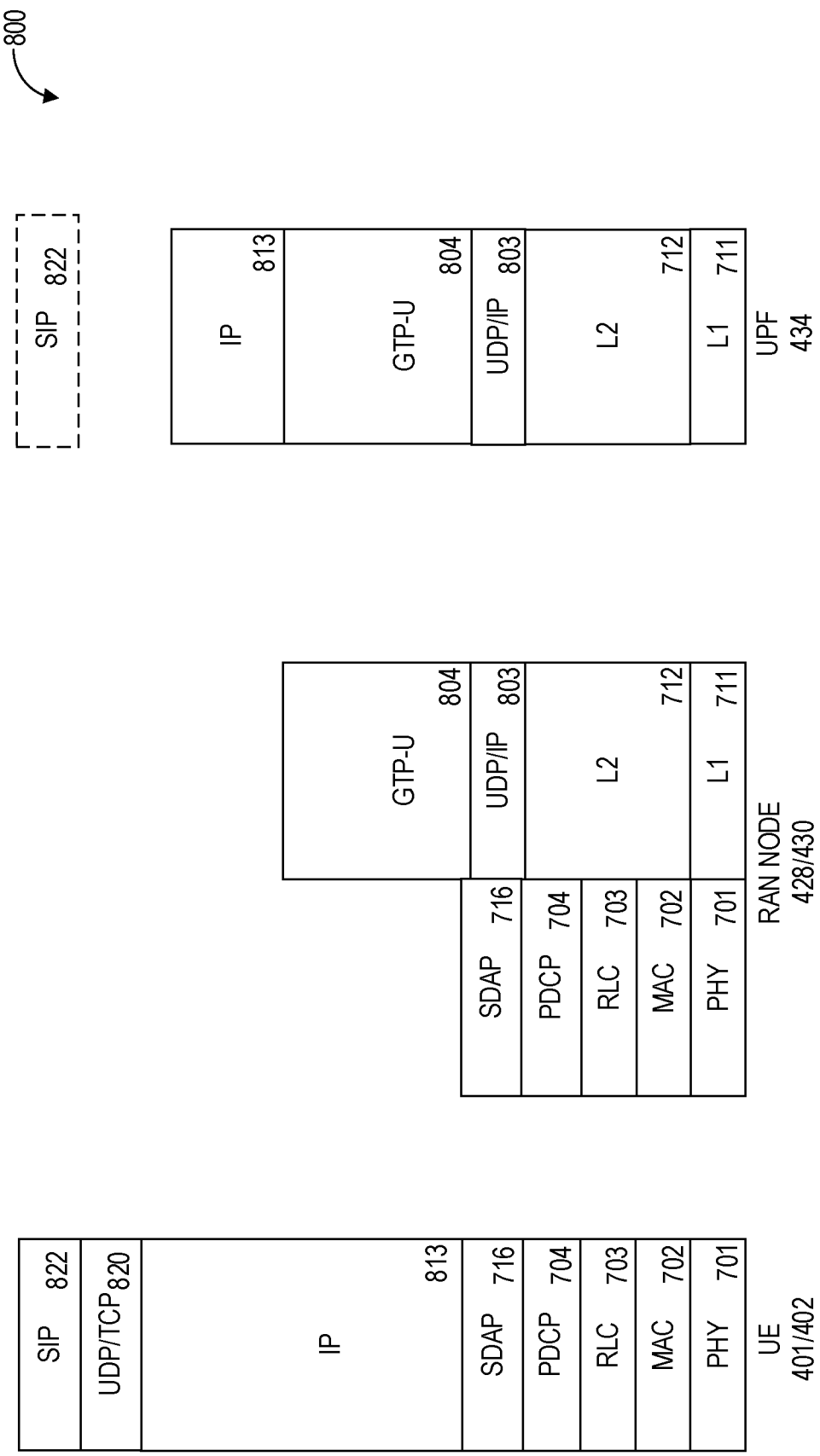
FIG. 8 is an illustration of an exemplary user plane protocol stack in accordance with some aspects.

Processors of the application circuitry 502 and processors of the baseband circuitry 504 may be used to execute elements of one or more instances of a protocol stack (e.g., protocol stack described with respect to FIG. 4, FIG. 7, or FIG. 8). For example, processors of the baseband circuitry 504, alone or in combination, may be used execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 455, 705). As referred to herein, Layer 2 may comprise a MAC layer (e.g., 420, 702), a RLC layer (e.g., 430, 703), and a PDCP layer (e.g., 440, 704). As referred to herein, Layer 1 may comprise a PHY layer (e.g., 410, 701) of a UE/RAN node. Accordingly, in various examples, applicable means for transmitting may be embodied by such devices or media.

Figure 6:
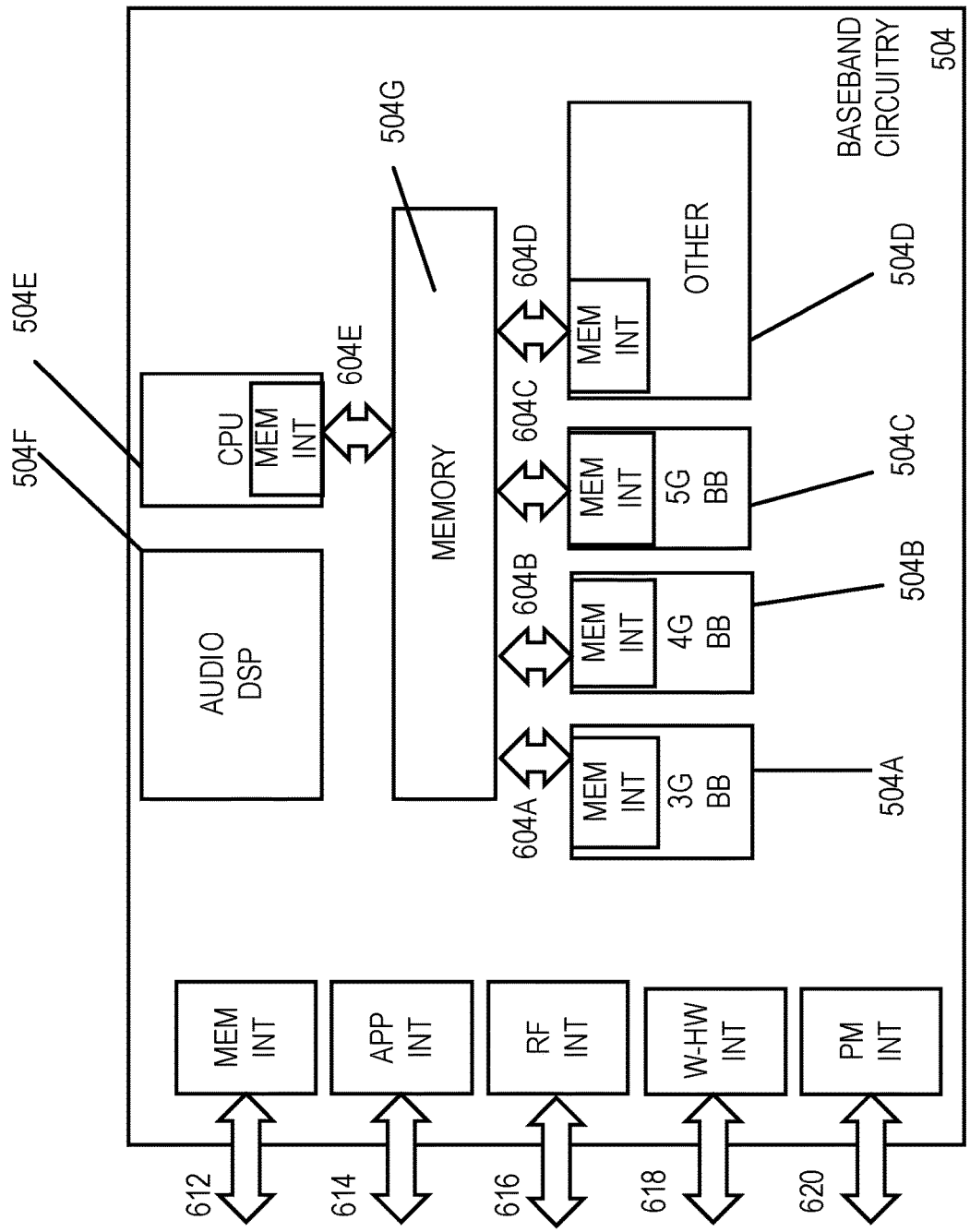
FIG. 6 illustrates example interfaces of baseband circuitry in accordance with some aspects.

FIG. 6 illustrates example interfaces of baseband circuitry in accordance with some aspects. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512).

FIG. 7 is an illustration of a control plane protocol stack in accordance with some aspects. In an aspect, a control plane 700 is shown as a communications protocol stack between the UE 201/203, the RAN node 243 (or alternatively, the RAN node 245), and the AMF 247. The PHY layer 701 may in some aspects transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 703 may in some aspects operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and segmentation and reassembly of RLC SDUs for UM and AM data transfers. The RLC layer 703 may also maintain sequence numbers independent of the ones in PDCP for UM and AM data transfers. The RLC layer 703 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 704 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 705 may include broadcast of system information (e.g., included in Master Information Blocks (MIBs) or System Information Blocks (SIBs) related to the non-access stratum (NAS)); broadcast of system information related to the access stratum (AS); paging initiated by 5GC 220 or NG-RAN 239/236, establishment, maintenance, and release of an RRC connection between the UE and NG-RAN (e.g., RRC connection paging, RRC connection establishment, RRC connection addition, RRC connection modification, and RRC connection release, also for carrier aggregation (CA) and Dual Connectivity (DC) in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. The MIBs and SIBs may comprise one or more information elements (IEs), which may each comprise individual data fields or data structures. The RRC layer 705 may also, in some aspects, execute QoS management functions, detection of and recovery from radio link failure, and NAS message transfer between the NAS 706 in the UE and the NAS 706 in the AMF 232.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
| --- | --- | --- | --- |
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 201 and the RAN node 243/245 may utilize an NG radio interface (e.g., an LTE-Uu interface or an NR radio interface) to exchange control plane data via a protocol stack comprising the PHY layer 701, the MAC layer 702, the RLC layer 703, the PDCP layer 704, and the RRC layer 705.

The non-access stratum (NAS) protocols 706 form the highest stratum of the control plane between the UE 201 and the AMF 247 as illustrated in FIG. 7 In aspects, the NAS protocols 706 support the mobility of the UE 201 and the session management procedures to establish and maintain IP connectivity between the UE 201 and the UPF 249. In some aspects, the UE protocol stack can include one or more upper layers, above the NAS layer 706. For example, the upper layers can include an operating system layer 724, a connection manager 720, and application layer 722. In some aspects, the application layer 722 can include one or more clients which can be used to perform various application functionalities, including providing an interface for and communicating with one or more outside networks. In some aspects, the application layer 722 can include an IP multimedia subsystem (IMS) client 726.

The NG Application Protocol (NG-AP) layer 715 may support the functions of the N2 and N3 interface and comprise Elementary Procedures (EPs). An EP is a unit of interaction between the RAN node 243/245 and the 5GC 220. In certain aspects, the NG-AP layer 715 services may comprise two groups: UE-associated services and non-UEassociated services. These services perform functions including, but not limited to: UE context management, PDU session management and management of corresponding NG-RAN resources (e.g. Data Radio Bearers (DRBs)), UE capability indication, mobility, NAS signalling transport, and configuration transfer (e.g. for the transfer of Self-Organizing Network (SON) information).

The Stream Control Transmission Protocol (SCTP) layer (which may alternatively be referred to as the SCTP/IP layer) 714 may ensure reliable delivery of signalling messages between the RAN node 243/245 and the AMF 247 based, in part, on the IP protocol, supported by the IP layer 713. The L2 layer 712 and the L1 layer 711 may refer to communication links (e.g., wired or wireless) used by the RAN node 243/245 and the AMF 247 to exchange information. The RAN node 243/245 and the AMF 247 may utilize an N2 interface to exchange control plane data via a protocol stack comprising the L1 layer 711, the L2 layer 712, the IP layer 713, the SCTP layer 714, and the S1-AP layer 715.

FIG. 8 is an illustration of a user plane protocol stack in accordance with some aspects. In this aspect, a user plane 800 is shown as a communications protocol stack between the UE 201/203, the RAN node 243 (or alternatively, the RAN node 245), and the UPF 249. The user plane 800 may utilize at least some of the same protocol layers as the control plane 700. For example, the UE 201/203 and the RAN node 243 may utilize an NR radio interface to exchange user plane data via a protocol stack comprising the PHY layer 701, the MAC layer 702, the RLC layer 703, the PDCP layer 704, and the Service Data Adaptation Protocol (SDAP) layer 716. The SDAP layer 716 may, in some aspects, execute a mapping between a Quality of Service (QoS) flow and a data radio bearer (DRB) and a marking of both DL and UL packets with a QoS flow ID (QFI). In some aspects, an IP protocol stack 813 can be located above the SDAP 716. A user datagram protocol (UDP)/transmission control protocol (TCP) stack 820 can be located above the IP stack 813. A session initiation protocol (SIP) stack 822 can be located above the UDP/TCP stack 820, and can be used by the UE 201/203 and the UPF 249.

The General Packet Radio Service (GPRS) Tunneling Protocol for the user plane (GTP-U) layer 804 may be used for carrying user data within the 5G core network 220 and between the RAN (e.g., 210-J) and the 5G core network 220. The user data transported can be packets in IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 243/245 and the UPF 249 may utilize an N3 interface to exchange user plane data via a protocol stack comprising the L1 layer 911, the L2 layer 912, the UDP/IP layer 803, and the GTP-U layer 804. As discussed above with respect to FIG. 6, NAS protocols support the mobility of the UE 201 and the session management procedures to establish and maintain IP connectivity between the UE 201 and the UPF 249.

Figure 9:
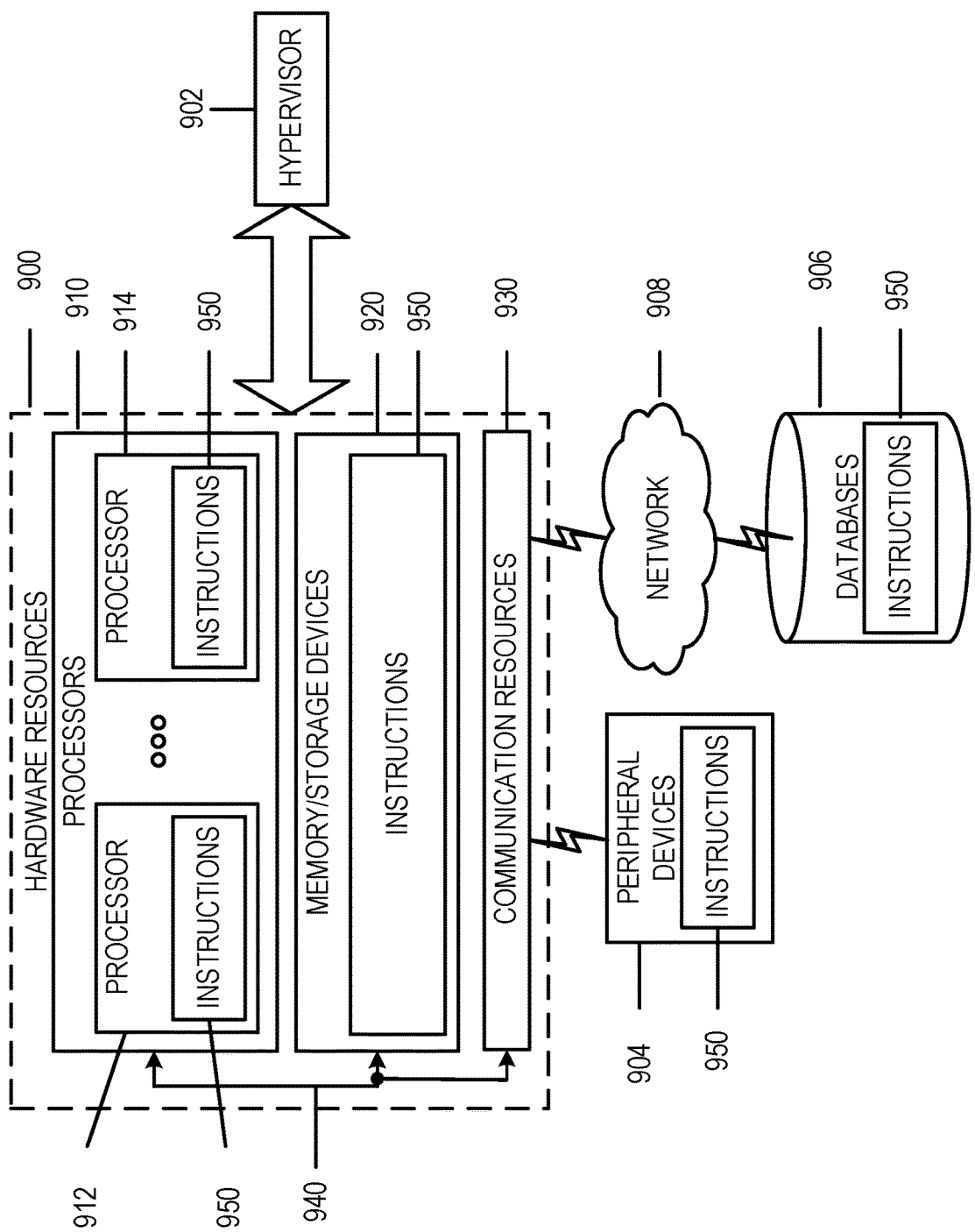
FIG. 9 is a block diagram illustrating components, according to some example aspects, able to read instructions from a machine-readable or computer-readable medium (e.g., a non-transitory machine-readable storage medium) and perform any one or more of the methodologies discussed herein.

FIG. 9 is a block diagram illustrating components, according to some example aspects, able to read instructions from a machine-readable or computer-readable medium (e.g., a non-transitory machine-readable storage medium) and perform any one or more of the methodologies discussed herein, for example, measurement and filtering and/or filtering coefficient configuration operations. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For aspects in which node virtualization (e.g., NFV) is utilized, a hypervisor 902 may be executed to provide an execution environment for one or more network slices or sub-slices to utilize the hardware resources 900

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media. Accordingly, in various examples, applicable means for storing may be embodied by such devices or media.

Figure 10:
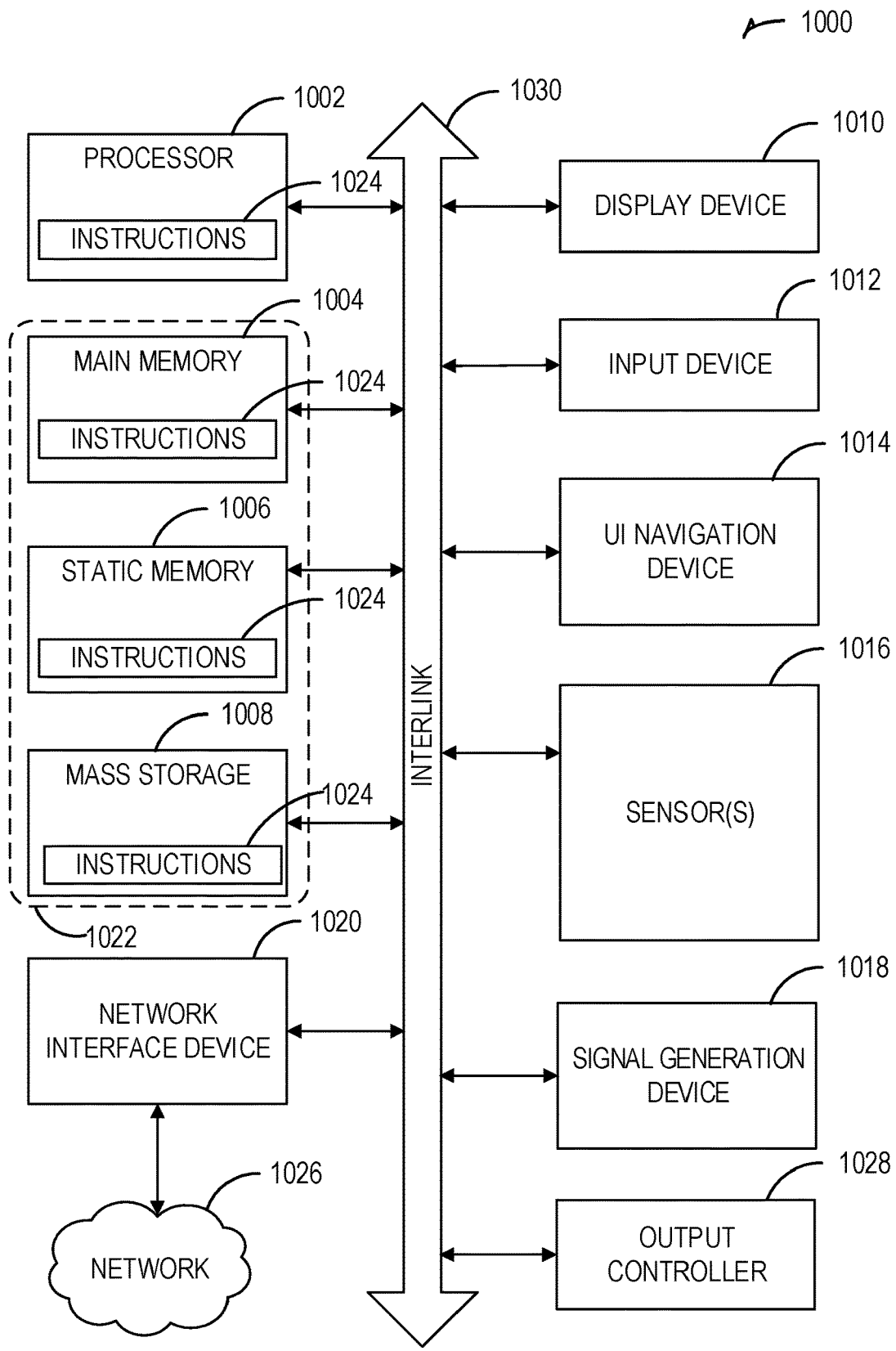
FIG. 10 illustrates a block diagram of an example computing machine, in accordance with some aspects.

FIG. 10 illustrates a block diagram of an example machine 1000 upon which any one or more of the techniques (e.g., methodologies) discussed herein may be performed, for example, measurement and filtering and/or filtering coefficient configuration operations. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow. Accordingly, in various examples, applicable means for processing (e.g., receiving, decoding, updating, configuring, transmitting, modifying, etc.) may be embodied by such processing circuitry.

In alternative aspects, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drive, tape drive, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine-readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

Figure 11:
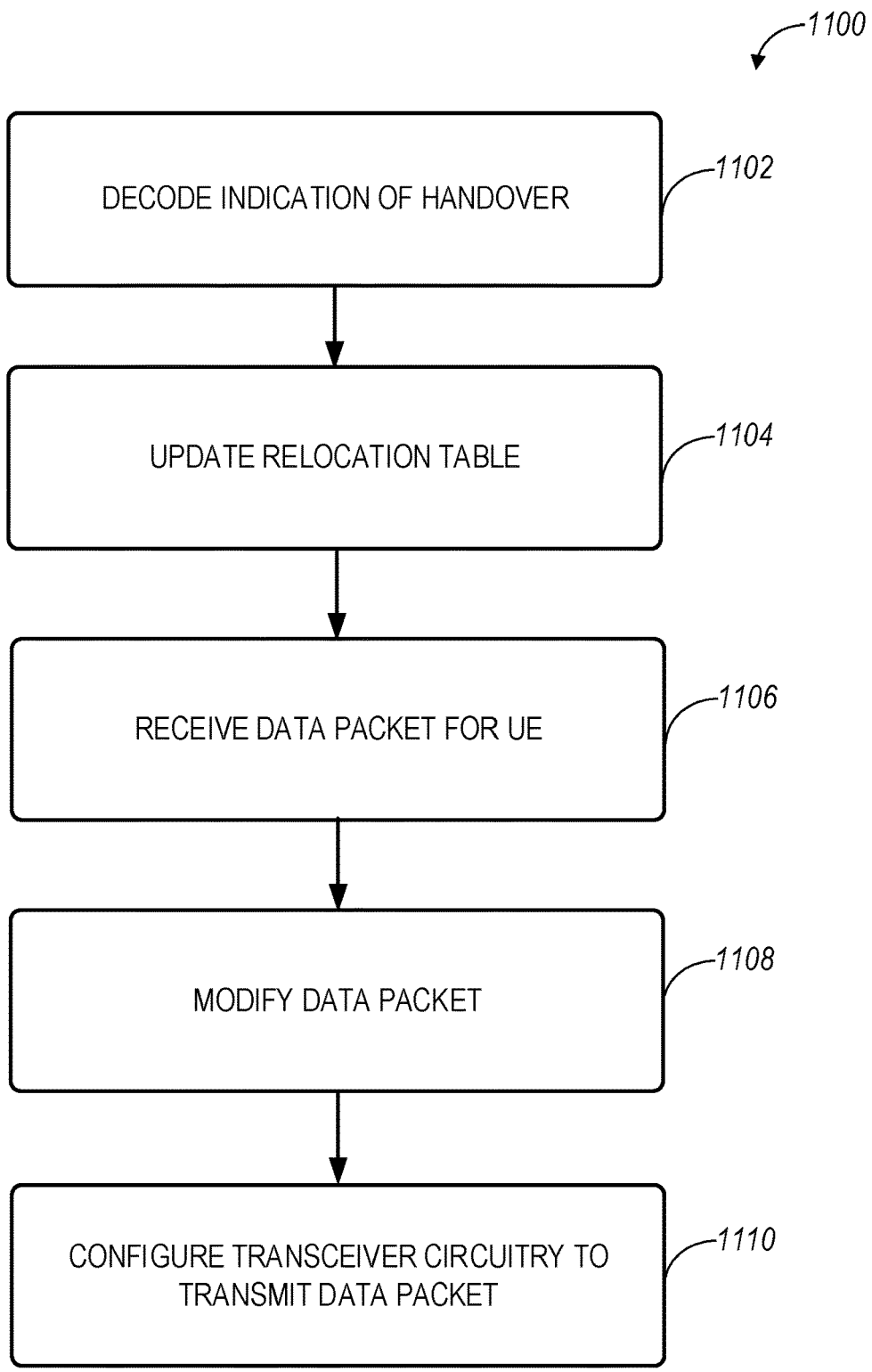
FIG. 11 illustrates generally a flow of an exemplary method of configuring filter coefficients, in accordance with some aspects.

FIG. 11 illustrates generally a flow of an exemplary method 1100 of configuring filter coefficients, in accordance with some aspects. It is important to note that aspects of the method 1100 may include additional or even fewer operations or processes in comparison to what is illustrated in FIG. 11. In addition, aspects of the method 1100 are not necessarily limited to the chronological order that is shown in FIG. 11. In describing the method 1100, reference may be made to FIGS. 1-12, although it is understood that the method 1100 may be practiced with any other suitable systems, interfaces and components. For example, reference may be made to systems 200A-200J described earlier for illustrative purposes, but the techniques and operations of the method 1100 are not so limited. In some aspects, operations of the method 1100 can be performed by a device (or an apparatus of the device) such as a wireless communication device, UE, or any other network device as described herein. Further, operations can be performed by virtualized functions of the SDN or NFV networks described herein.

In operation 1102, a UE (e.g., UE 201 or 203) can decode, from RRC signalling, a measurement configuration IE that includes a measurement quantity parameter, a RS-type filter configuration and at least one filter coefficient. The measurement quantity parameter can indicate at least one of a cell measurement quantity and a beam measurement quantity.

In operation 1104, the UE can filter (e.g., adapt a layer 3 filter to performing filtering of) the at least one of the cell measurement result and the beam measurement result, according to the measurement configuration IE. In some aspects, if the measurement quantity parameter indicates the cell measurement quantity, the UE (e.g., UE processing circuitry) can adapt the layer 3 filter to perform filtering of the cell measurement result according to the RS type filter configuration and the filter coefficient to determine a measurement evaluation input for a measurement reporting operation. In some aspects, if the measurement quantity parameter indicates the beam measurement quantity, the UE can adapt the layer 3 filter to perform filtering of the beam measurement result according to the RS type filter configuration and the filter coefficient to determine a beam measurement selection input for a beam measurement selection operation.

In operation 1106, the UE can encode a measurement report for transmission to a BS (e.g., gNB, eNB). The measurement report can include at least one of measurement report information and beam measurement selection information based on the measurement reporting operation and the beam measurement selection operation. The UE memory can be configured to store the measurement configuration IE. In some aspects, the measurement quantity parameter can include at least one of a cell quantity coefficient or a beam quantity coefficient and the cell quantity coefficient can be a separate coefficient from the beam quantity coefficient.

The RS-type filter configuration can include at least one of a SSB-based coefficient or a CSI-RS-based coefficient and the SSB-based coefficient can be a separate coefficient from the CSI-RS-based coefficient. The filter coefficient can be configured as a RSRP filter coefficient, an RSRQ filter coefficient or a RS-SINR filter coefficient, and the RSRP filter coefficient, the RSRQ filter coefficient, and the RS-SINR filter coefficient can be separate (e.g., layer 3) filtering coefficients.

Figure 12:
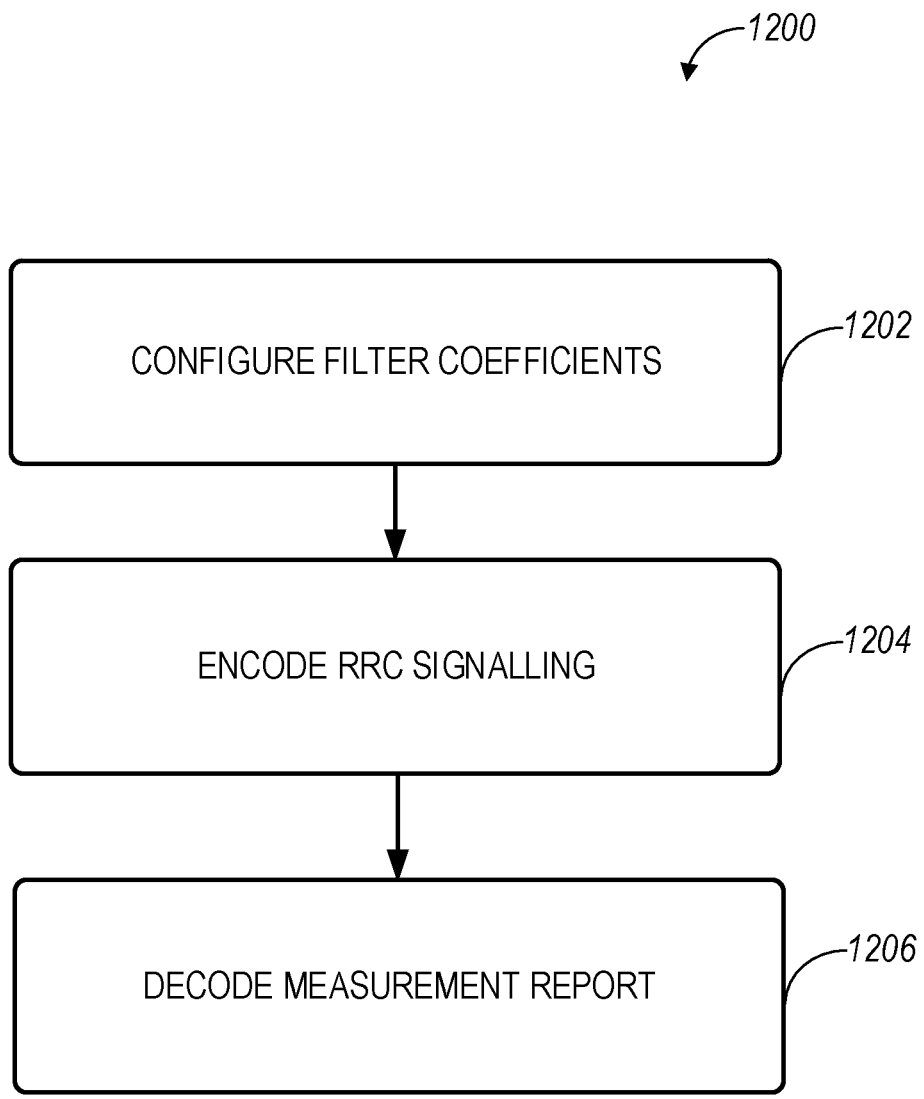
FIG. 12 illustrates generally a flow of an exemplary method of configuring filtering coefficients, in accordance with some aspects.

FIG. 12 illustrates generally a flow of an exemplary method 1200 of configuring filtering coefficients, in accordance with some aspects. In some aspects, operations of the method 1200 can be performed by a device (or an apparatus of the device) such as a network entity, BS (e.g., gNB, eNB), or any other network device as described herein. Further, operations can be performed by virtualized functions of the SDN or NFV networks described herein.

In operation 1202, a BS can configure one or more filtering coefficients and/or configurations. For example, the BS can configure an RS-type filter configuration to include at least one of a SSB-based coefficient or a CSI-RS-based coefficient and the SSB-based coefficient can be a separate coefficient from the CSI-RS-based coefficient. The BS can also configure at least one of a RSRP filter coefficient, a RSRQ filter coefficient and a RS-SINR filter coefficient and the RSRP filter coefficient, the RSRQ filter coefficient and the RS-SINR filter coefficient can be separate layer 3 filtering coefficients. The BS can configure a measurement quantity parameter to include at least one of a cell quantity coefficient or a beam quantity coefficient and the cell quantity coefficient can be a separate coefficient from the beam quantity coefficient. The BS can also configure a measurement configuration IE to include the RS-type filter configuration, the measurement quantity parameter and at least one of the layer 3 filtering coefficients.

In operation 1204, the BS can encode RRC signalling to include the measurement configuration IE, for transmission to a UE, for determining at least one of a measurement evaluation input for a measurement reporting operation or a beam measurement selection input for a beam measurement selection operation. In operation 1206, the BS can decode, from signalling received from the UE, a measurement report including at least one of measurement report information and beam measurement selection information, based on the measurement configuration IE. In some aspects, the memory of the BS can be configured to store the measurement report received from the UE.

Any of the radio links described herein may operate according to any one or more of the following exemplary radio communication technologies or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a user equipment (UE), the apparatus comprising: memory; and processing circuitry configured to: decode, from radio resource control (RRC) signaling, a measurement configuration information element (IE) including a measurement quantity parameter, a reference signal (RS)-type filter configuration and at least one filter coefficient, wherein the measurement quantity parameter indicates at least one of a cell measurement quantity and a beam measurement quantity; adapt a layer 3 filter to filter the at least one of the cell measurement result and the beam measurement result, according to the measurement configuration IE, wherein if the measurement quantity parameter indicates the cell measurement quantity, the processing circuitry is configured to adapt the layer 3 filter to filter the cell measurement result according to the RS type filter configuration and the filter coefficient to determine a measurement evaluation input for a measurement reporting operation, and wherein if the measurement quantity parameter indicates the beam measurement quantity, the processing circuitry is configured to adapt the layer 3 filter to filter the beam measurement result according to the RS type filter configuration and the filter coefficient to determine a beam measurement selection input for a beam measurement selection operation; and encode a measurement report, for transmission to a base station (BS), the measurement report including at least one of measurement report information and beam measurement selection information, based on the measurement reporting operation and the beam measurement selection operation, and wherein the memory is configured to store the measurement configuration IE.

In Example 2, the subject matter of Example 1 includes, wherein the measurement quantity parameter includes at least one of a cell quantity coefficient or a beam quantity coefficient, and wherein the cell quantity coefficient is a separate coefficient from the beam quantity coefficient.

In Example 3, the subject matter of Examples 1-2 includes, wherein the RS-type filter configuration includes at least one of a synchronization signal block (SSB)-based coefficient or a channel state information-reference signal (CSI-RS)-based coefficient, and wherein the SSB-based coefficient is a separate coefficient from the CSI-RS-based coefficient.

In Example 4, the subject matter of Examples 1-3 includes, filtering coefficients.

In Example 5, the subject matter of Examples 1-4 includes, wherein the processing circuitry is configured to: adapt transceiver circuitry to receive at least one beam transmitted from the BS; determine a beam measurement of the least one beam; adapt a layer 1 filter to filter the beam measurement of the at least one beam to determine the beam measurement result; and report the beam measurement result from the layer 1 to the layer 3 for determining at least one of the measurement evaluation input and the beam measurement selection input.

In Example 6, the subject matter of Example 5 includes, wherein the measurement configuration IE further includes at least one measurement object coefficient of a measurement object, wherein the measurement object coefficient is a separate coefficient from a second measurement object coefficient of a second measurement object, and wherein the processing circuitry is configured to measure the at least one beam at a frequency indicated by the measurement object to determine at least one of the cell measurement result or the beam measurement result.

In Example 7, the subject matter of Examples 5-6 includes, wherein the measurement configuration IE further includes at least one measurement frequency coefficient of a measurement frequency, wherein the measurement frequency coefficient is a separate coefficient from a second measurement frequency coefficient of a second measurement frequency, and wherein the processing circuitry is configured to measure the at least one beam at the measurement frequency indicated by the measurement frequency coefficient to determine at least one of the cell measurement result or the beam measurement result.

In Example 8, the subject matter of Examples 5-7 includes, wherein the cell measurement result is a cell quality value and wherein the processing circuitry is configured to determine the cell quality value by consolidating the beam measurement result.

In Example 9, the subject matter of Examples 2-8 includes, wherein the measurement quantity parameter includes a single measurement quantity coefficient for indicating the cell measurement quantity and the beam measurement quantity.

In Example 10, the subject matter of Examples 3-9 includes, wherein the RS-type filter configuration includes a single RS-type filter coefficient for indicating a SSB-based measurement and a CSI-RS-based measurement.

In Example 11, the subject matter of Examples 4-10 includes, wherein the filter coefficient is a single filter coefficient configured to indicate an RSRP-based measurement, an RSRQ-based measurement, and an RS-SINR-based measurement.

In Example 12, the subject matter of Examples 1-11 includes, wherein the processing circuitry is configured to evaluate reporting criteria using the measurement evaluation input to determine the measurement report information.

In Example 13, the subject matter of Examples 11-12 includes, wherein the processing circuitry is configured to select the beam measurement selection input to determine beam measurement information.

In Example 14, the subject matter of Examples 1-13 includes, wherein the apparatus further comprises a transceiver configured to be coupled to at least one antenna, the antenna and the transceiver configured to receive the RRC signaling and transmit the measurement report to the BS.

Example 15 is an apparatus of a base station (BS), the apparatus comprising: memory; and processing circuitry adapted to: configure a reference signal (RS)-type filter configuration to include, at least one of a synchronization signal block (SSB)-based coefficient or a channel state information-reference signal (CSI-RS)-based coefficient, wherein the SSB-based coefficient is a separate coefficient from the CSI-RS-based coefficient; configure at least one of a reference signal received power (RSRP) filter coefficient, a reference signal received quality (RSRQ) filter coefficient and a reference signal-signal to interference plus noise ratio (RS-SINR) filter coefficient, wherein the RSRP filter coefficient, the RSRQ filter coefficient, and the RS-SINR filter coefficient are separate layer 3 filtering coefficients; configure a measurement quantity parameter to include at least one of a cell quantity coefficient or a beam quantity coefficient, wherein the cell quantity coefficient is a separate coefficient from the beam quantity coefficient; configure a measurement configuration information element (IE) to include the RS-type filter configuration, the measurement quantity parameter and at least one of the layer 3 filtering coefficients; encode radio resource control (RRC) signaling to include the measurement configuration IE, for transmission to a user equipment (UE), for determining at least one of a measurement evaluation input for a measurement reporting operation or a beam measurement selection input for a beam measurement selection operation; and decode, from signalling received from the UE, a measurement report including at least one of measurement report information and beam measurement selection information, based on the measurement configuration IE, and wherein the memory is configured to store the measurement report.

Example 16 is a computer-readable hardware storage device that stores instructions for execution by one or more processors of a user equipment (UE), the instructions to configure the one or more processors to: decode, from radio resource control (RRC) signaling, a measurement configuration information element (IE) including a measurement quantity parameter, a reference signal (RS)-type filter configuration and at least one filter coefficient, wherein the measurement quantity parameter indicates at least one of a cell measurement quantity and a beam measurement quantity; adapt a layer 3 filter to filter the at least one of the cell measurement result and the beam measurement result, according to the measurement configuration IE, wherein if the measurement quantity parameter indicates the cell measurement quantity, the processing circuitry is configured to adapt the layer 3 filter to filter the cell measurement result according to the RS type filter configuration and the filter coefficient to determine a measurement evaluation input for a measurement reporting operation, and wherein if the measurement quantity parameter indicates the beam measurement quantity, the processing circuitry is configured to adapt the layer 3 filter to filter the beam measurement result according to the RS type filter configuration and the filter coefficient to determine a beam measurement selection input for a beam measurement selection operation; and encode a measurement report, for transmission to a base station (BS), the measurement report including at least one of measurement report information and beam measurement selection information, based on the measurement reporting operation and the beam measurement selection operation.

In Example 17, the subject matter of Example 16 includes, wherein the measurement quantity parameter includes at least one of a cell quantity coefficient or a beam quantity coefficient, and wherein the cell quantity coefficient is a separate coefficient from the beam quantity coefficient.

In Example 18, the subject matter of Examples 16-17 includes, wherein the RS-type filter configuration includes at least one of a synchronization signal block (SSB)-based coefficient or a channel state information-reference signal (CSI-RS)-based coefficient, and wherein the SSB-based coefficient is a separate coefficient from the CSI-RS-based coefficient.

In Example 19, the subject matter of Examples 16-18 includes, filtering coefficients.

In Example 20, the subject matter of Examples 16-19 includes, wherein the instructions are to configure the one or more processors to: adapt transceiver circuitry to receive at least one beam transmitted from the BS; determine a beam measurement of the least one beam; adapt a layer 1 filter to filter the beam measurement of the at least one beam to determine the beam measurement result; and report the beam measurement result from the layer 1 to the layer 3 for determining at least one of the measurement evaluation input and the beam measurement selection input.

Example 21 is a method of configuring filter coefficients comprising: decoding, from radio resource control (RRC) signaling, a measurement configuration information element (IE) including a measurement quantity parameter, a reference signal (RS)-type filter configuration and at least one filter coefficient, wherein the measurement quantity parameter indicates at least one of a cell measurement quantity and a beam measurement quantity; adapting a layer 3 filter to filter the at least one of the cell measurement result and the beam measurement result, according to the measurement configuration IE, wherein if the measurement quantity parameter indicates the cell measurement quantity, adapting the layer 3 filter to filter the cell measurement result according to the RS type filter configuration and the filter coefficient to determine a measurement evaluation input for a measurement reporting operation, and wherein if the measurement quantity parameter indicates the beam measurement quantity, adapting the layer 3 filter to filter the beam measurement result according to the RS type filter configuration and the filter coefficient to determine a beam measurement selection input for a beam measurement selection operation; and encoding a measurement report, for transmission to a base station (BS), the measurement report including at least one of measurement report information and beam measurement selection information, based on the measurement reporting operation and the beam measurement selection operation.

In Example 22, the subject matter of Example 21 includes, wherein the measurement quantity parameter includes at least one of a cell quantity coefficient or a beam quantity coefficient, and wherein the cell quantity coefficient is a separate coefficient from the beam quantity coefficient.

In Example 23, the subject matter of Examples 21-22 includes, wherein the RS-type filter configuration includes at least one of a synchronization signal block (SSB)-based coefficient or a channel state information-reference signal (CSI-RS)-based coefficient, and wherein the SSB-based coefficient is a separate coefficient from the CSI-RS-based coefficient.

In Example 24, the subject matter of Examples 21-23 includes, filtering coefficients.

In Example 25, the subject matter of Examples 21-24 includes, adapting transceiver circuitry to receive at least one beam transmitted from the BS; determining a beam measurement of the least one beam; adapting a layer 1 filter to filter the beam measurement of the at least one beam to determine the beam measurement result; and reporting the beam measurement result from the layer 1 to the layer 3 for determining at least one of the measurement evaluation input and the beam measurement selection input.

In Example 26, the subject matter of Example 25 includes, wherein the measurement configuration IE further includes at least one measurement object coefficient of a measurement object, wherein the measurement object coefficient is a separate coefficient from a second measurement object coefficient of a second measurement object, and wherein the further comprises measuring the at least one beam at a frequency indicated by the measurement object to determine at least one of the cell measurement result or the beam measurement result.

In Example 27, the subject matter of Examples 25-26 includes, wherein the measurement configuration IE further includes at least one measurement frequency coefficient of a measurement frequency, wherein the measurement frequency coefficient is a separate coefficient from a second measurement frequency coefficient of a second measurement frequency, and wherein the method further comprises measuring the at least one beam at the measurement frequency indicated by the measurement frequency coefficient to determine at least one of the cell measurement result or the beam measurement result.

In Example 28, the subject matter of Examples 25-27 includes, wherein the cell measurement result is a cell quality value and wherein the method further comprises determining the cell quality value by consolidating the beam measurement result.

In Example 29, the subject matter of Examples 22-28 includes, wherein the measurement quantity parameter includes a single measurement quantity coefficient for indicating the cell measurement quantity and the beam measurement quantity.

In Example 30, the subject matter of Examples 23-29 includes, wherein the RS-type filter configuration includes a single RS-type filter coefficient for indicating a SSB-based measurement and a CSI-RS-based measurement.

In Example 31, the subject matter of Examples 24-30 includes, wherein the filter coefficient is a single filter coefficient configured to indicate an RSRP-based measurement, an RSRQ-based measurement, and an RS-SINR-based measurement.

In Example 32, the subject matter of Example 31 includes, wherein the method further comprises evaluating reporting criteria using the measurement evaluation input to determine the measurement report information.

In Example 33, the subject matter of Examples 31-32 includes, wherein the method further comprises selecting the beam measurement selection input to determine beam measurement information.

Example 34 is a method of configuring filter coefficients comprising: configuring a reference signal (RS)-type filter configuration to include, at least one of a synchronization signal block (SSB)-based coefficient or a channel state information-reference signal (CSI-RS)-based coefficient, wherein the SSB-based coefficient is a separate coefficient from the CSI-RS-based coefficient; configuring at least one of a reference signal received power (RSRP) filter coefficient, a reference signal received quality (RSRQ) filter coefficient and a reference signal-signal to interference plus noise ratio (RS-SINR) filter coefficient, wherein the RSRP filter coefficient, the RSRQ filter coefficient, and the RS-SINR filter coefficient are separate layer 3 filtering coefficients; configuring a measurement quantity parameter to include at least one of a cell quantity coefficient or a beam quantity coefficient, wherein the cell quantity coefficient is a separate coefficient from the beam quantity coefficient; configuring a measurement configuration information element (IE) to include the RS-type filter configuration, the measurement quantity parameter and at least one of the layer 3 filtering coefficients; encoding radio resource control (RRC) signaling to include the measurement configuration IE, for transmission to a user equipment (UE), for determining at least one of a measurement evaluation input for a measurement reporting operation or a beam measurement selection input for a beam measurement selection operation; and decoding, from signalling received from the UE, a measurement report including at least one of measurement report information and beam measurement selection information, based on the measurement configuration IE.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

In Example 39, the subject matter of Examples 1-38 includes, wherein the BS is a virtualized network function (VNF).

In Example 40, the subject matter of Examples 1-38 includes, wherein the BS is a function of a virtualized processing node of a network function virtualization (NFV) system.

Example 41 is at least one machine-readable medium including instructions that, when executed by processing circuitry, cause the processing circuitry to perform operations to implement of any of Examples 1-40.

Example 42 is a software defined networking (SDN) system including one or more virtualized functions adapted to perform any of the operations of Examples 1 to 41.

Example 43 is a network function virtualization (NFV) system having virtualized processing nodes adapted to perform any of the operations of Examples 1 to 42.

Example 44 is an Internet of Things (IoT) network topology, the IoT network topology comprising respective communication links adapted to perform communications for the operations of any of Examples 1 to 43.

Example 45 is a network comprising respective devices and device communication mediums for performing any of the operations of Examples 1 to 44.

What is claimed is:

1. A user equipment (UE), the UE comprising:
a radio; and
processor operably connected to the radio and configured to cause the UE to:
receive radio-resource control (RRC) signaling comprising a measurement configuration for at least one of cell measurements or beam measurements, wherein the measurement configuration includes:
separate sets of filtering coefficients for at least one measurement reference signal type, wherein each set of filtering coefficients includes separate layer 3 (L3) filtering coefficients for each of one or more measurements quantities; and
perform measurements in accordance with the measurement configuration.

2. The UE, of claim 1, wherein the at least one measurement reference signal type includes one or more of channel state information reference signals (CSI-RS) or synchronization signal block (SSB).

3. The UE of claim 1, wherein the one or more measurement quantities include reference signal received power (RSRP), reference signal received quality (RSRQ), and reference signal signal-and-interference-to-noise ratio (RS-SINR).

4. The UE of claim 1, wherein the processor is further configured to cause the UE to perform L3 filtering on layer 1 (L1) beam measurement results for one of the at least one measurement reference signal type.

5. The UE of claim 4, wherein to perform L3 filtering on the L1 beam measurement results for one of the at least one measurement reference signal type is in response to an indication of a beam measurement quantity.

6. The UE of claim 4, wherein to perform L3 filtering on the L1 beam measurement results for one of the at least one measurement reference signal type is in response to an indication of a cell measurement quantity.

7. The UE of claim 1, wherein the measurement configuration includes a reference signal type filter configuration.

8. The UE of claim 1, wherein the measurement configuration includes an indication to measure at least one beam at an indicated frequency.

9. One or more non-transitory computer-readable media having instructions that, when executed by one or more processors, cause a user equipment (UE) to:
receive radio-resource control (RRC) signaling comprising a measurement configuration including one of a MeasConfig information element (IE) or a MeasObjectNR IE, wherein the measurement configuration includes:
separate sets of filtering coefficients for at least one measurement reference signal type and at least one of a cell measurement or beam measurement, wherein each set of filtering coefficients includes separate layer 3 (L3) filtering coefficients for each of one or more measurement quantities; and
perform measurements in accordance with the measurement configuration.

10. The one or more non-transitory computer-readable media of claim 9, wherein the at least one measurement reference signal type includes one or more of channel state information reference signals (CSI-RS) or synchronization signal block (SSB).

11. The one or more non-transitory computer-readable media of claim 9, wherein the one or more measurement quantities include reference signal received power (RSRP), reference signal received quality (RSRQ), and reference signal signal-and-interference-to-noise ratio (RS-SINR).

12. The one or more non-transitory computer-readable media of claim 9, wherein the instructions, when executed by the one or more processors, cause the UE to perform L3 filtering on layer 1 (L1) beam measurement results for one of the at least one measurement reference signal type.

13. The one or more non-transitory computer-readable media of claim 12, wherein to perform L3 filtering on the L1 beam measurement results for one of the at least one measurement reference signal type is in response to an indication of a beam measurement quantity.

14. The one or more non-transitory computer-readable media of claim 12, wherein to perform L3 filtering on the L1 beam measurement results for one of the at least one measurement reference signal type is in response to an indication of a cell measurement quantity.

15. The one or more non-transitory computer-readable media of claim 9, wherein the measurement configuration includes a reference signal type filter configuration.

16. The one or more non-transitory computer-readable media of claim 9, wherein the measurement configuration includes an indication to measure at least one beam at an indicated frequency.

17. A method, comprising:
at a base station:
transmitting, to a user equipment (UE), radio-resource control (RRC) signaling comprising a measurement configuration including one of a MeasConfig information element (IE) or a MeasObjectNR IE, wherein the measurement configuration includes:
separate sets of filtering coefficients for at least one measurement reference signal type and at least one of a cell measurement or beam measurement, wherein each set of filtering coefficients includes separate layer 3 (L3) filtering coefficients for each of one or more measurement quantities; and
receiving a measurement report in accordance with the measurement configuration.

18. The method of claim 17, wherein the at least one measurement reference signal type includes one or more of channel state information reference signals (CSI-RS) or synchronization signal block (SSB).

19. The method of claim 17, wherein the one or more measurement quantities include reference signal received power (RSRP), reference signal received quality (RSRQ), and reference signal signal-and-interference-to-noise ratio (RS-SINR).

20. The method of claim 17, wherein the measurement report is based on L3 filtering on layer 1 (L1) beam measurement results for one of the at least one measurement reference signal type.

* * * * *